United States Patent [19]
Uraki et al.

[11] Patent Number: 5,654,992
[45] Date of Patent: Aug. 5, 1997

[54] METHOD OF REPAIRING STRUCTURAL MATERIALS OF NUCLEAR REACTOR INTERNALS AND APPARATUS THEREFOR

[75] Inventors: Keiichi Uraki, Hitachi; Hisanori Okamura, Toukai-mura; Toshimi Matsumoto, Hitachinaka; Toshitaka Satsuta, Atsugi; Mitsuo Nakamura, Takahagi; Akira Onuma; Tsutomu Onuma, both of Hitachi; Takahiko Kato, Hitachinaka; Jun'ya Kaneda; Kunihiko Suzuki, both of Hitachi, all of Japan

[73] Assignee: Hitachi, Ltd., Tokyo, Japan

[21] Appl. No.: 491,657

[22] Filed: Jun. 19, 1995

[30] Foreign Application Priority Data

Jun. 20, 1994 [JP] Japan ................................ 6-136885

[51] Int. Cl.$^6$ .................................................. G21C 19/00
[52] U.S. Cl. .......................... 376/260; 219/82; 228/110.1; 29/402.16
[58] Field of Search ........................ 376/260; 219/78.01, 219/81, 82, 83; 228/110.1, 115, 119, 228; 29/402.16, 469.5, 723, DIG. 48

[56] References Cited

U.S. PATENT DOCUMENTS 4,585,608  4/1986  Day ........................................... 376/245

OTHER PUBLICATIONS

Journal of Material Science, vol. 26, (1991), pp. 2063–2070, H.T. Lin, et al.

Metallurgical Transaction A., vol. 21A (1990/9) pp. 2585–2596, H.T. Lin, et al.

Welding Journal (1991/5), pp. 123–132, S.H. Goods, et al.

Metallurgical Transaction A. vol. 23A (1992/5), pp. 1021–1032, S.H. Goods, et al.

Welding Journal (1992/4), pp. 43–51, E.A. Franco–Ferreira, et al. DP–MS–89–41 (DE90–001312) Helium Induced Weld Cracking in Irradiated 304 Stainless Steel (U), A.K. Birchenall.

*Primary Examiner*—Daniel D. Wasil
*Attorney, Agent, or Firm*—Kenyon & Kenyon

[57] ABSTRACT

A neutron-irradiated structural material having a defect in a nuclear reactor internals is repaired by covering the structural material to be repaired with a plate to cover over a portion thereof having the defect, and then welding the plate and the structural material by locally applying pressure on the surface of the plate and adding energy to the portion to which the pressure is applied thereby to generate thermal energy in the contact surfaces between the plate and the structural material.

16 Claims, 17 Drawing Sheets

METHOD OF REPAIRING STRUCTURAL MATERIALS OF NUCLEAR REACTOR INTERNALS AND APPARATUS THEREFOR

BACKGROUND OF THE INVENTION

The present invention relates to a method of repairing a structure or a component composing internals of a nuclear reactor pressure vessel in a nuclear power plant in service and, more particularly, to a method of repairing a structure or a component irradiated with neutrons and having a crack defect by covering the defect portion of the structure with a cover plate and welding the structure and the cover plate to realize a high reliable repair for the integrity after the repair.

It is worried to occur a crack defect such as a stress corrosion cracking in a structure or a component under a high temperature and high pressure environment in a reactor pressure vessel as time passes. The stress corrosion cracking occurs in a superposed condition of a deterioration factor such as local change in the composition of a material itself, a stress factor of tensile remaining stress applied to the structure due to welding or the like and a corrosion environment factor under a high temperature and high pressure environment, and the crack grows. When the crack grows through the structure or the component, a serious accident may occur in the nuclear plant by some possibility. Therefore, a repairing technology to prevent a through-crack in the structure having the crack is necessary.

As for such a repairing technology to prevent a through-crack, there is a repairing method shown in FIG. 19a, wherein the growth of crack is prevented by covering a region containing a crack 1 with a plate 3 and by filler-welding the edge portion of the plate 3 and the structure 2 utilizing heat input generated by arc or welding arc 6 while a filler metal 5 is being added to isolate the crack 1 from the corrosion environment.

However, the structure irradiated with high energy particle rays such as α-rays, β-rays, neutron rays or the like contains He generated by nuclear transformation of the component elements of the structure. In a case wherein a structure of such a material containing He is covered with a plate and the edge of the plate and the structure are filler-welded as described above, heat is inevitably input large enough to melt the filler material, a part of the base material and a part of the plate in a conventional welding technology such as arc welding. Therefore, when the structure 2 irradiated with neutrons and having a crack 1 is repaired by filler-welding the cover plate 3 and the structure 2 as shown in FIG. 19a, the heat affected zone 8 due to the weld in the structure around the filler-welded portion 7 of the repaired portion possibly may become a new heat affected zone to produce a crack 9, as shown in FIG. 19b.

The above problem for austenitic stainless steel is described in, for example, Journal of Material Science, Vol. 26(1991), pp 2063–2070. The mechanism of occurrence of a crack is that when welding work is performed with adding heat on the above material of an alloy containing generated He and having a cumulative total amount of neutron irradiation more than $1.0 \times 10^{20}$ n/m², the He easily diffuses to the crystal grain boundaries of the material by thermal activation due to heating of the welding heat affected zone near the welded portion, and the He voids collected in the grain boundaries gathers to form bubbles having sizes of μm order to decrease the strength of grain boundaries of the material. Further when a tensile stress due to solidification and shrinkage is added to the material after the welding, cracks occur in the grain boundaries in the heat affected zone of non-melted portion.

As for repairing of a structure with a crack which is the object of the present invention, in the repairing method according to the conventional technology of covering the structure with a plate and filler-welding it to the structure, the plate and the structure are closely contacted so that the side surface of the edge portion of the plate and the surface of the structure are in a face-contact state, and the filler wire, the side surface of the edge portion of a plate and the surface of the structure are melted to be welded while the filler wire is being fed and thermal energy is being input. Therefore, there are some cases where the amount of heat input added to the structure becomes locally high. Under such a welding condition, there is a possibility that the He easily diffuses to the crystal grain boundaries of the material by thermal activation due to heating of the welding heat affected zone, and the heat affected zone in the structure becomes a new crack generating portion.

There are various disclosures concerning relations between welding of steel containing He and cracking. They are as follows:

Metallurgical Transaction A. Vol. 21A (1990/9) pp. 2585–2596 [H. T. Lin etc.], which discloses that when GTA arc welding is applied to He containing stainless steel, intergranular cracking occurs in a welding heat affected zone; decrease in welding heat input tends to decrease in cracking sensibility.

Welding Journal (1991/5) pp. 123–132 [S. H. Goods etc.], which discloses relations between He amount and cracking property when large heat input GMA welding is applied to 304 stainless steel containing He, wherein as the heat input becomes smaller, scale of cracking becomes small, as in FIG. 12.

Metallurgical Transaction A Vol. 23A (1992/5) pp. 1021–1032 [S. H. Goods etc.], which discloses welding cracking of irradiated material is due to formation/growth/joining of He bubbles, and wherein mechanism of cracking caused by He is discussed.

Welding Journal (1992/4) pp. 43–51 [E. A. Franco-Ferreira etc.], which discloses relations between welding heat input and cracking in case various He amounts are taken in GTA/GMA welding.

DP-MS-89-41 (DE90-001312) Herium Induced Weld Cracking In Irradiated 304 Stainless Steel (U) by A. K. Birchenall, which discloses a relation between welding heat input and cracking in case various He amount are taken.

SUMMARY OF THE INVENTION

The object of the present invention is to provide a repairing method securing the integrity of repaired portion with considering the problems in the conventional repairing method described above when repairing is performed on a crack such as a stress corrosion cracking occurred in a structure or a component made of stainless steel, a Ni based alloy or low alloy steel inside a reactor pressure vessel.

The above object of the present invention can be attained by providing a method of repairing a structural material such as stainless steel, a Ni based alloy or low alloy steel of a nuclear reactor internals having a crack and irradiated with α-rays, β-rays and neutron rays to the irradiation amount of 0 to $5.0 \times 10^{27}$ n/m² in a nuclear power plant in service, the method of repairing a structural material of a nuclear reactor internals comprising the steps of covering a region of the structural material having a crack defect with a plate to cover, welding the plate and the structural material to be repaired by locally applying pressure on the surface of the plate and adding energy to the portion to which the pressure is applied thereby to generate thermal energy in the contact surface between the plate and the structural material.

The present invention provides a method of repairing a structural material of a nuclear reactor internals, which is characterized, as the above step of welding the plate and the repaired structural material, by welding the plate and the structural material by heating with ohmic heat generated, by allowing current to flow the portion to be repaired while applying pressure on the surface of the plate. The present invention provides a method of repairing a structural material of a nuclear reactor internals, which is characterized, as the above step of welding the plate and the structural material by heating with ohmic heat generated, by seam-welding the cover plate to the structural material using a roller electrode. The present invention provides a method of repairing a structural material of a nuclear reactor internals, which is characterized, as the above-mentioned welding of the plate and the structural material by heating with ohmic heat generated, by resistance-spot-welding the cover plate to the structural material using a roller electrode. The present invention provides a method of repairing a structural material of a nuclear reactor internals, which is characterized in that the above-mentioned resistance-spot-welding of the plate and the repaired structural material by heating with ohmic heat generated is carried out by welding the structure and the cover plate at a plurality of positions at a time by allowing current to flow in a plurality of electrodes.

The present invention provides a method of repairing a structural material of a nuclear reactor internals, which is characterized in that the above mentioned welding of the plate and the repaired structural material is performed by generating thermal energy caused by frictional resistance by mechanically rubbing the contact surface between the structural material and the cover plate. The present invention provides a method of repairing a structural material of a nuclear reactor internals, which is characterized in that the above mentioned welding of the plate and the repaired structural material by generating thermal energy caused by frictional resistance is performed by giving mechanical vibration while applying pressure on the portion to be welded to mechanically rub the contact surface. The present invention provides a method of repairing a structural material of a nuclear reactor internals, which is characterized in that the above mentioned welding of the plate and the structural material by generating thermal energy caused by frictional resistance by giving mechanical vibration is performed by mechanically rubbing the contact surface by giving mechanical vibration obtained by converting high frequency energy into mechanical vibration through magneto-striction to the portion to be welded.

The present invention provides a method of repairing a structural material of a nuclear reactor internals, which is characterized, in the above repairing work, by providing convex projections on the surfaces of the cover plate as welding surfaces. The present invention provides a method of repairing a structural material of a nuclear reactor internals, which is characterized by providing concave notches on the positions of the structural material contacting to the convex projections on the cover plate, the cover plate being placed and welded to the structural material by engaging the convex projections on the welding surface of the cover plate with the concave notches.

The present invention provides a method of repairing a structural material of a nuclear reactor internals, which is characterized, in the above repairing work, by using a reactor internal structure or component as a supporting portion for means for offsetting the reaction force produced when the pressure is applied. The present invention provides a method of repairing a structural material of a nuclear reactor internals, which is characterized, as means for offsetting the reaction force produced when the pressure is applied, by introducing a supporting pillar between an upper grid plate and a core support plate of a light water reactor internals, the pillar supported with the upper grid plate and the core support plate being used as a supporting portion for means for offsetting the reaction force produced when the pressure is applied. The present invention provides a method of repairing a structural material of a nuclear reactor internals, which is characterized, as means for offsetting the reaction force produced when the pressure is applied, by introducing a supporting pillar between a pressure vessel and a core shroud, the pillar supported with the inner surface of the pressure vessel being used as a supporting portion for means for offsetting the reaction force produced when the pressure is applied.

The present invention provides a method of repairing a structural material of a nuclear reactor internals, which is characterized, in repairing work performing the above work to a structure of reactor internals contacting to the reactor water, by performing the above welding work by removing the oxide layer existing on a region including the weld surface of the position of the structural material to be repaired with the cover plate before placing the cover plate on a position of the structural material to be repaired, and then placing the cover plate. The present invention provides a method of repairing a structural material of a nuclear reactor internals, which is characterized, in repairing work performing the above work to a structure of reactor internals contacting to the reactor water, by performing the work for removing the oxide layer existing on a region including the weld surface of the position of the structural material to be repaired with the cover plate, performing surface finishing of the region including the weld surface of the position of the structural material to an average roughness of 0.2 to 10 µm, after performing the surface finishing, placing the cover plate and welding the plate to the position of the structural material.

The present invention provides a method of repairing a structural material of a nuclear reactor internals, which is characterized, in the above repairing work, by metallurgically welding a part of the outer periphery or the whole periphery in the contact surface of the cover plate and the repaired structural material.

The present invention provides an apparatus of repairing a structural material of a nuclear reactor internals, which is characterized by comprising means for offsetting the reaction force produced when the pressure is applied in order to perform the above work. The present invention provides an apparatus of repairing a structural material of a nuclear reactor internals, as means for offsetting the reaction force produced when the pressure is applied in order to perform the above work, which is characterized by comprising pressure supporting mechanism supported by an upper grid plate and a core support plate of a light water reactor internals as a means for applying the pressure. The present invention provides an apparatus of repairing a structural material of a nuclear reactor internals, as means for offsetting the reaction force produced when the pressure is applied in order to perform the above work, which is characterized by comprising a pressure supporting mechanism supported by the inner surface of a pressure vessel as a means for applying the pressure.

Before the description of the embodiments, the operation of the present invention will be described below.

The inventors found out that for the materials of alloys described above having the total amount of irradiation of α-rays, β-rays and neutrons less than $5.0 \times 10^{27}$ n/m², the diffusion of He in a heat affected zone of melted portion is suppressed and cracks do not occur in the melted portion nor in the heat affected zone near the melted zone if the repairing work is done within a short time of holding the materials at a temperature causing He thermal activation, which led to the present invention.

As to the work method of welding the structure and the cover plate, the work method to perform filler welding of melting an additive filler material is not employed in the present invention. In the present invention, while pressure is being locally applied to surfaces to be welded, resistance is produced in the welding surfaces with physical means and the portion is welded with the thermal energy generated by the produced resistance or the mechanical energy such as plastic deformation. In this working method, by controlling the pressure applied and the time to produce the resistance, it is possible to shorten the time holding a material at the temperature causing He thermal activity described above and to weld without occurrence of any crack.

The physical means for producing the thermal or mechanical energy while the welding surfaces are being pressed are a method to allow current to flow through the electrical resistance of the contact surfaces to generate ohmic heat and a method to giving mechanical friction to generate heat and plastic deformation.

Firstly, the principle and operation of the method welding the surfaces by allowing current to flow will be described below.

Figure 13:
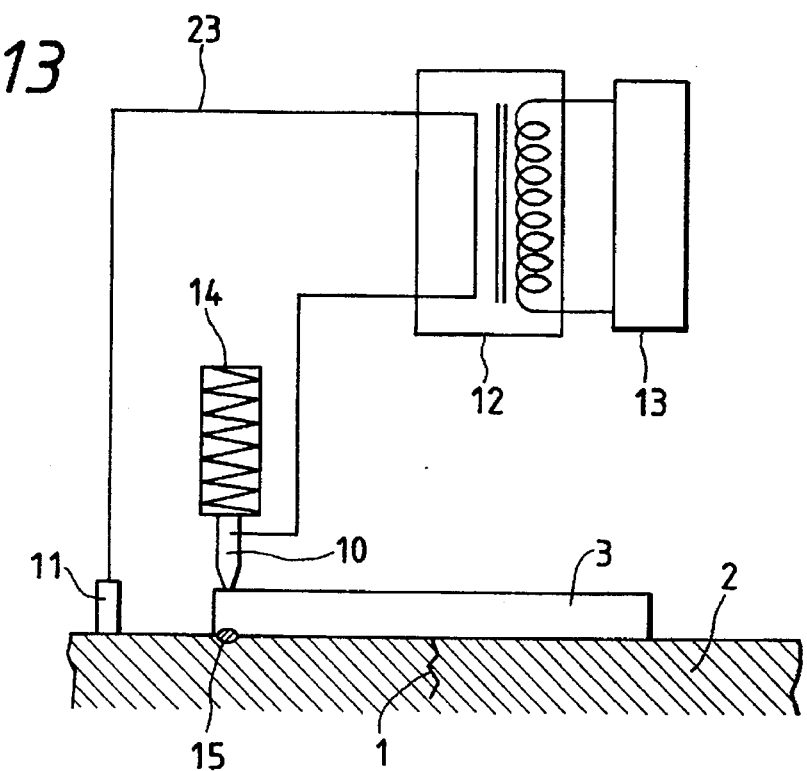
FIG. 13 is a view showing the principle of repairing work in accordance with the present invention where spot welding is performed by conducting current to an electrode while the electrode is pressed to a welded surface.

FIG. 13 is a schematic view showing the principle of repairing work where resistance spot welding is performed by allowing current while a structure to be repaired and a cover plate are pressed to each other. The structure 2 is irradiated with neutrons and has cracking 1 therein. A cover plate 2 is disposed on the structure so as to cover the cracking 1. An electrode 10 contacts to the cover plate 3 and an electrode 11 contacts to the surface of the structure 2 irradiated with neutrons, the both electrodes being electrically connected to each other by a cable 23 through a transformer 12 electrically connected to the cable 23, the current flowing between the electrode and the material being controlled with the transformer 12. A pressure applying mechanism 14 is provided in the electrode 10 contacting to the cover plate 3 to locally apply pressure to the contact surfaces of the cover plate 3 and the structure 2. Pressure is applied to the contact portion just under the electrode 10 of the cover plate 3 and the structure 2 with the pressure applying mechanism 14. Ohmic heat is generated in the electric resistance in the contact portion when current is conducted there under pressure applying state. Both of the cover plate and the structure are melted with the heat generated and solidified by stopping the flow of current or by removing the pressure to form welded portion 15. Therein, the amount of the ohmic heat generated is expressed by the following equation.

$$Q = \rho \cdot j^2 \cdot t \; [J/m^3]$$

ρ: specific resistivity j: current density t: current passage time

In a welding work where a large amount of current flows in a small duration under a condition of applying a certain magnitude of pressure, current flowing in an extremely small duration shorter than 0.1 second can generate sufficient heat enough to form the welding portion 15 by locally melting the cover plate and the structure.

In such work of current flow in a small duration, the time holding the temperature in the heat affected zone near the melting portion within the temperature region of thermal activation is very short. Therefore, it is possible to perform welding almost without giving heat affect causing He diffusion or bubble formation in grain boundaries to the base material.

Figure 14:
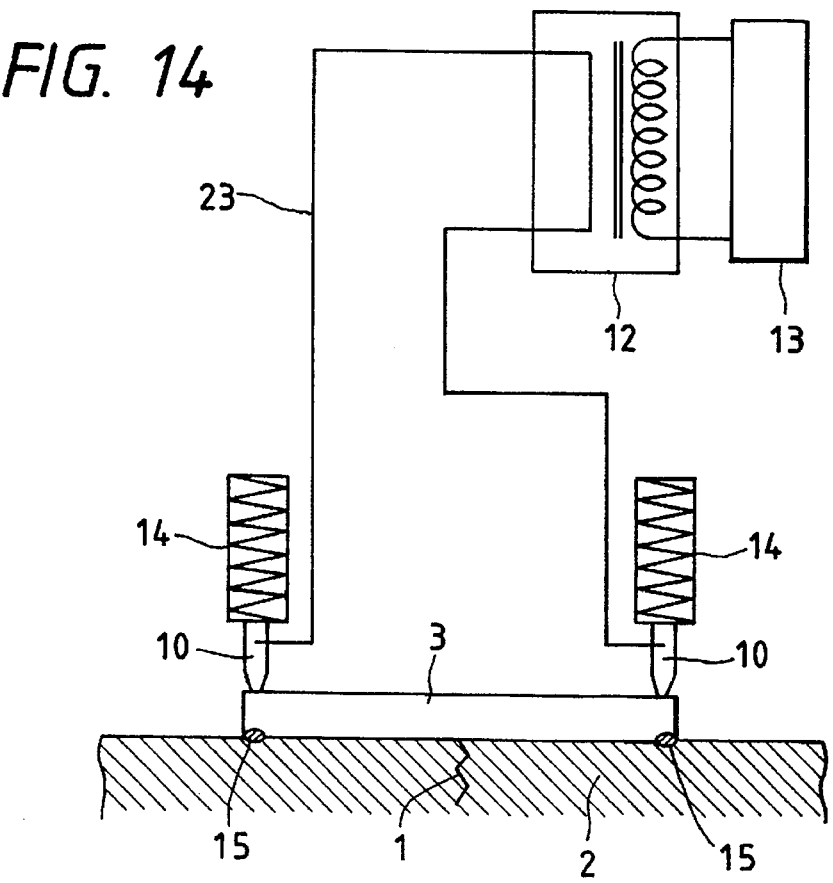
FIG. 14 is a view showing the principle of repairing work in accordance with the present invention where spot welding is performed by placing a cover plate on a structure and by conducting current to two electrodes while the both electrodes are pressed to a welded surface.

It is also possible to weld positions of the contact surface just under a plurality of electrodes at a time by providing a mechanism 14 applying pressure on the plurality of electrodes as shown in FIG. 14.

Figure 15:
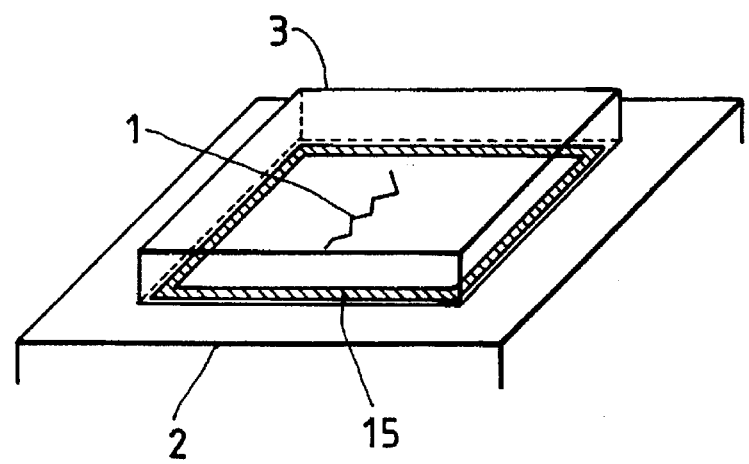
FIG. 15 is a view showing a feature after completion of welding work between a structure and a cover plate in accordance with the present invention.

In the method of resistance-spot-welding as described above, the electrode is moved step-by-step after completion of welding work for one position. By doing so, the cover plate 3 is welded to the structure 2 continuously as shown in FIG. 15.

Figure 16:
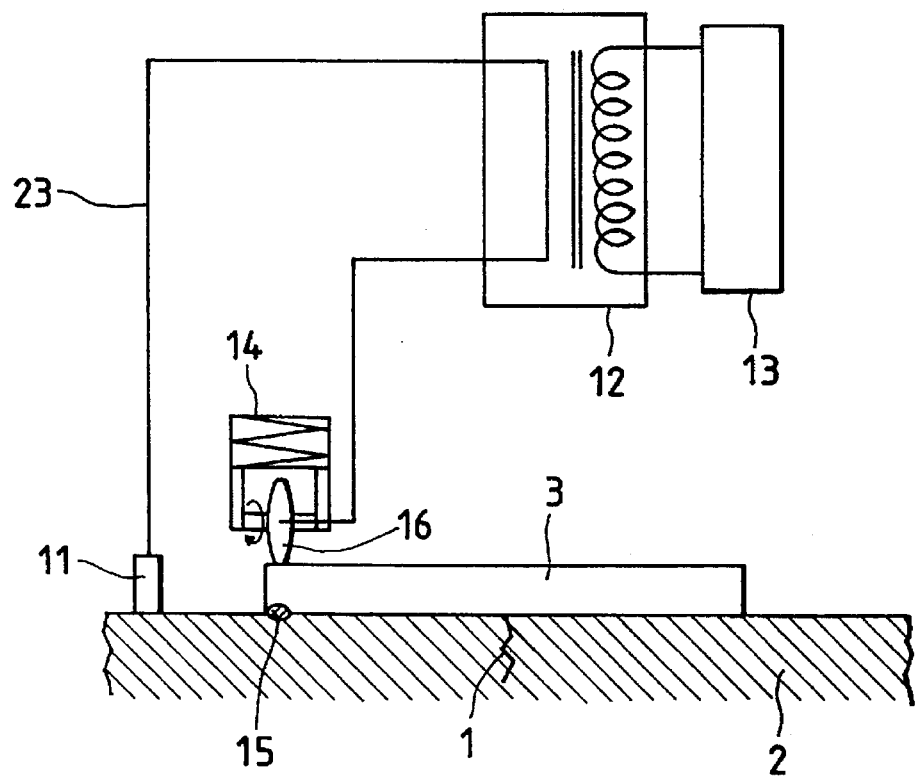
FIG. 16 is a view showing the principle of repairing work in accordance with the present invention where welding is performed by placing a cover plate on a structure and by conducting current to a roller electrode while the roller electrode is pressed to a welded surface.

Further, as shown in FIG. 16, by using a disk-shaped roller electrode 16, a continuous welded portion can be easily formed by conducting current to the electrode while the electrode is being rotated around an axis parallel to the surface of the cover plated 3 and pressed. In this method, the continuous welded portion is easily formed when current is conducted continuously. However, when current is conducted intermittently, the continuous welded portion 15 can be also formed by controlling the duration of current flowing and the speed of welding work (the travelling velocity).

As an example of the method to utilizing mechanical friction, the principle and operation of the method welding the surfaces by giving mechanical vibration to the contact surface to produce mechanical friction will be described below.

Figure 17:
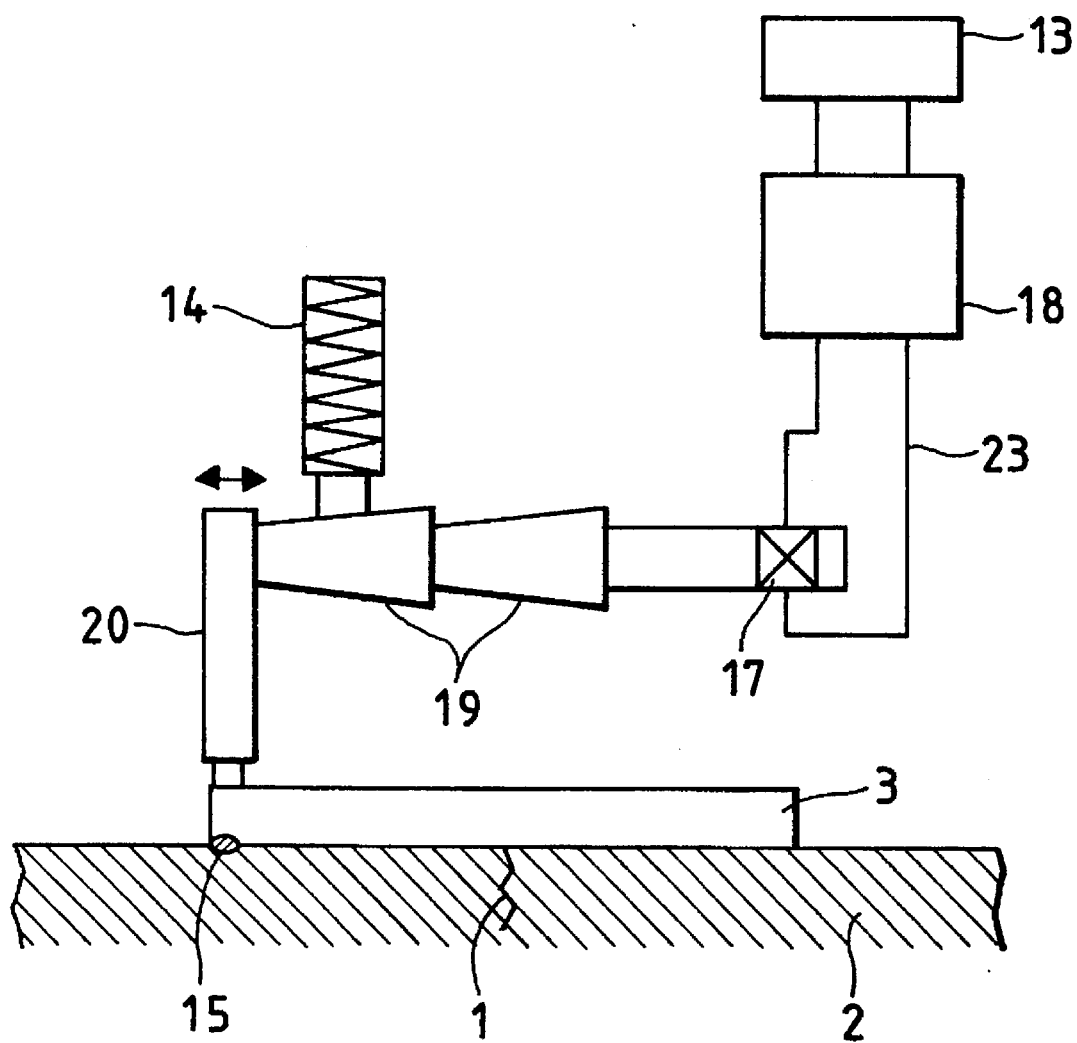
FIG. 17 is a view showing the principle of repairing work in accordance with the present invention where welding is performed by placing a cover plate on a structure and by giving vibration to a welded surface using a ultrasonic oscillator while the ultrasonic oscillator is pressed to the welded surface.

FIG. 17 shows the repairing work where an ultrasonic oscillator is utilized as a means for giving the mechanical vibration. By conducting high frequency current to a vibrator 17 composed of a magnetic material and a coil using an ultrasonic oscillator 18, the vibrator 17 is vibrated with magneto-strictive phenomenon. The generated vibration is amplified in its amplitude with a resonator 19, and a work terminal 20 is vibrated in the direction indicated by an arrow with the amplified amplitude. With the vibration, friction causes in the contact surfaces of the cover plate 3 and the structure 2 pressed with a pressure applying mechanism 14. Plastic deformation as well as heat is generated in the contact surfaces with the friction. The deformed surfaces are closely approached to each other to a distance of acting inter-atomic force by the effect of atomic movement due to the pressure and the heating up to a temperature above re-crystallization, and then the contact surfaces are welded together with bonding force. Although the factors of working condition considered are output and frequency of ultrasonic wave, amplified amplitude, applied pressure and so on, it is possible to perform welding without formation of bubbles of He in the grain boundaries by setting the working condition so as to avoid to heat above the melting temperature. Since the working duration in this method is exceedingly short, the welding is hardly affected by the formation of bubbles of He in the grain boundaries even if heating above the melting temperature occurs locally.

In the method of welding the cover plate and the structure, the electrode is moved step-by-step after completion of welding work for one position. By doing so, the cover plate is welded to the structure continuously. Further, as described above, by using a disk-shaped roller electrode 16, a continuous welded portion can be easily formed by conducting current to the electrode while the electrode is being rotated and pressed.

Figure 18A:
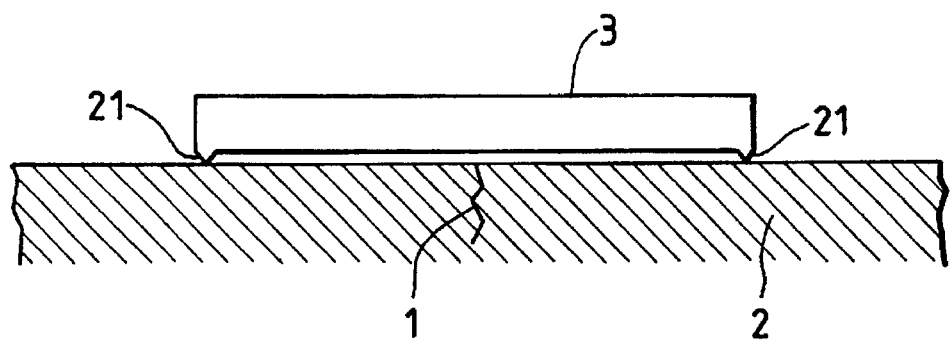
FIG. 18a, 18b and 18c are schematic views showing the features of welding with providing projections on a cover plate and a structure to be repaired in accordance with the present invention.

The operation of welding work where projections are provided on the cover plate according to the present invention will be described below. FIG. 18a is a schematic view showing a cover plate 3 having projections 21 placed on a structure 3. The portions of a contact surface just below electrodes are pressed with a pressure applying mechanism as shown in FIG. 13 to FIG. 17, and consequently the applied pressure is concentrated. Therefore, it is possible to prevent a trouble in welding work due to pressure dissipation in the contact surface. The same effect may be attained in the method of applying friction described above.

Figure 18B:
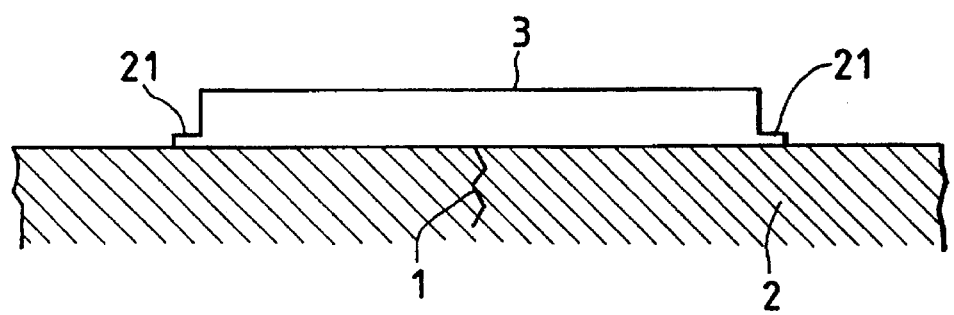

FIG. 18b shows an example where projections 21 are provided on the side surfaces of a cover plate. In a case of using a thick cover plate, there is an effect to concentrate the applied pressure by using the projections 21 as the contact surfaces.

Figure 18C:
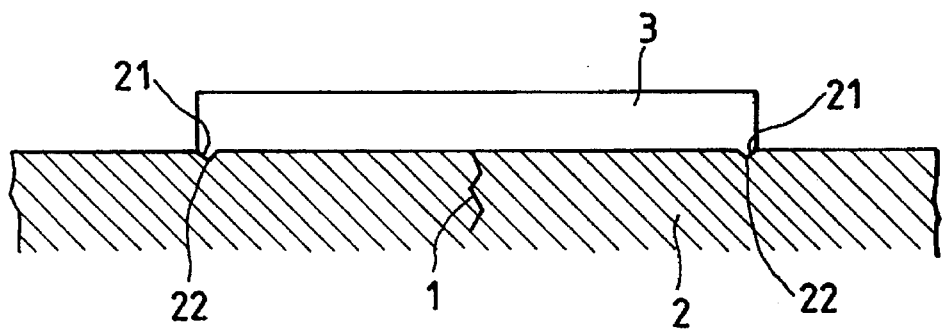

FIG. 18c a schematic view showing an example where concave cut portions 22 are provided on a structure and the cover plate having projections described above is placed in engaging with the cut portions. By using the cut portions 22 on the structure and the projections 21 on the cover plate as the contact portions, the applied pressure is concentrated and at the same time it is possible to perform the welding work under a condition that the cover plate 3 and the structure 2 closely contact to each other.

Figure 9:
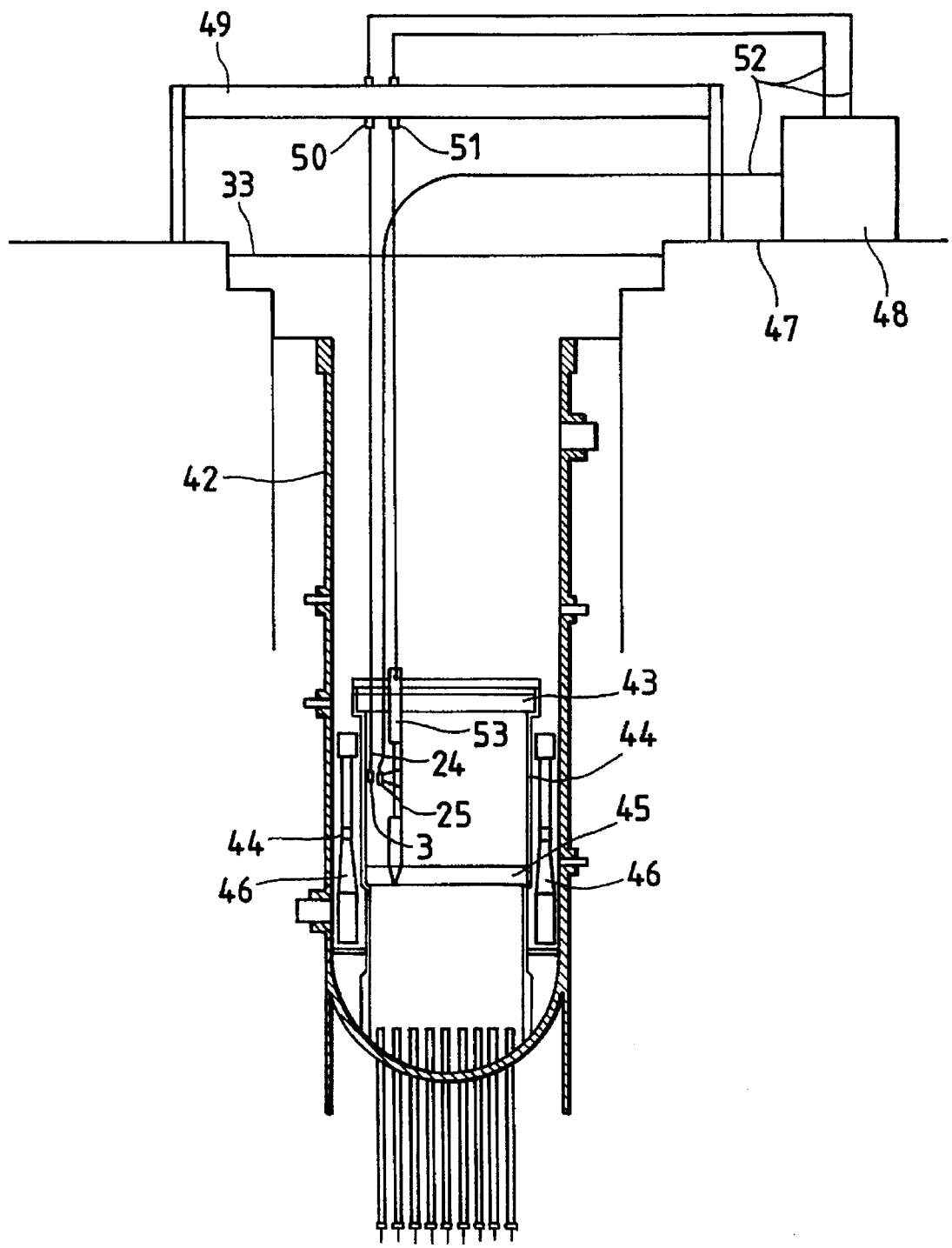
FIG. 9 is a schematic view showing a repairing method inside a reactor pressure vessel in accordance with the present invention.
Figure 11:
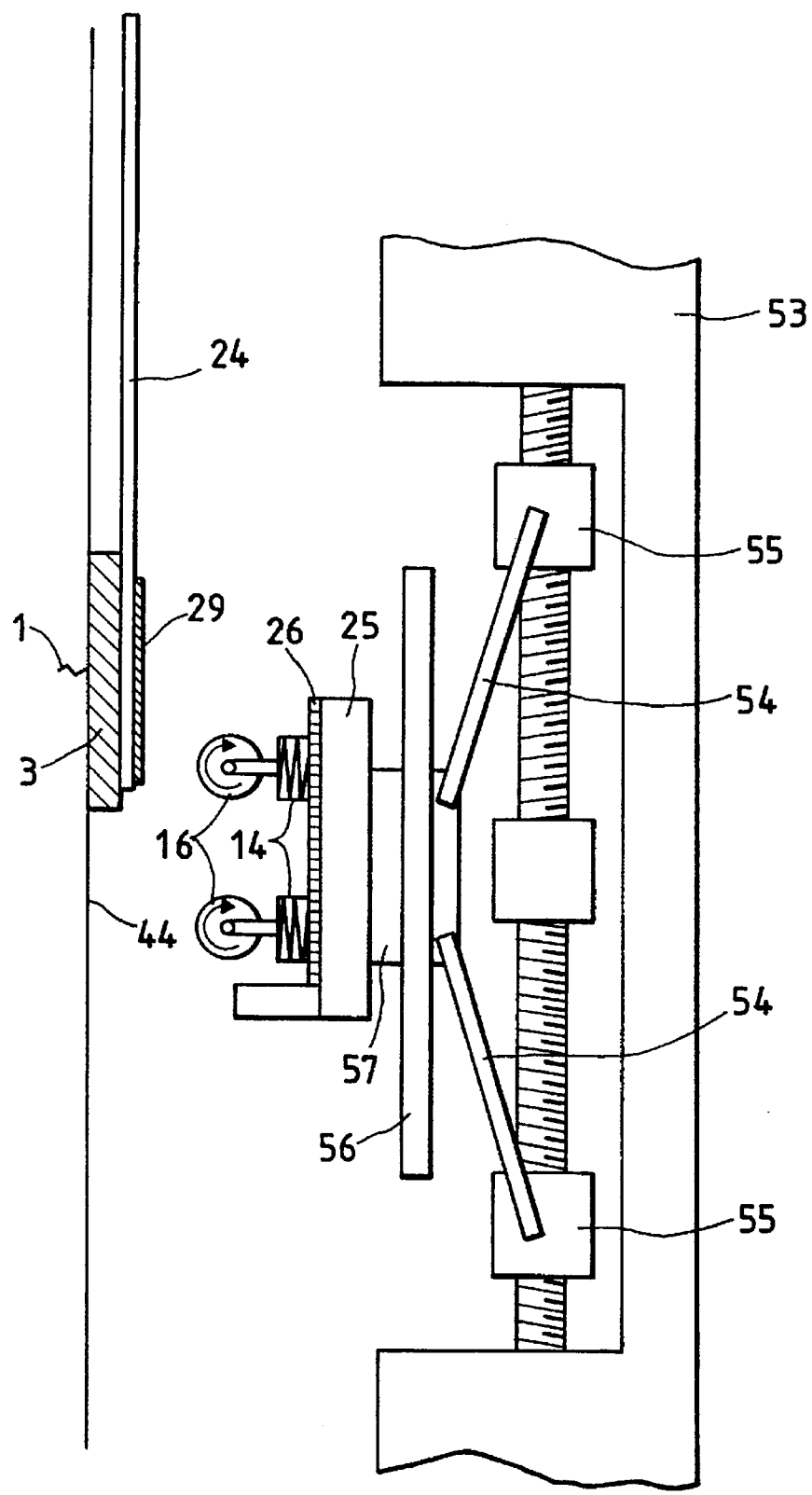
FIG. 11 is a schematic view showing another embodiment of a repairing method inside a reactor pressure vessel in accordance with the present invention.

The basic condition in the above welding work according to the present invention is that pressure is locally applied to the contact surfaces of the cover plate and the structure. Therefore, in order to apply a certain amount of pressure to the contact surface described above in a core of a light water reactor, it is necessary to offset the reaction force when pressure is applied in the direction opposite to the direction applying the pressure. For instance, in welding work for the inside surface of a pipe, the work can be easily performed by using the opposite side as a pressure supporting portion. However, when work is performed to a structure having a complex shape inside a reactor, a means for providing a support point supporting the pressure applied to the contact surface is required to offset the reaction force. In the present invention, it is possible to use a reactor internal or component as the support point for a means to offset the reaction force produced when pressure is applied. For example, in the welding work to the inner surface of a shroud 44 of a reactor internal as shown in FIG. 9, a supporting pillar 53 for work inside reactor is introduced between an upper grid plate 43 and a core support plate 45 of the reactor internals. By using the pillar supported with the upper grid plate and the core support plate as a supporting point, the reaction force produced when pressure is applied can be offset. In the welding work to the outer surface of the above shroud 44 shown in FIG. 11, a supporting pillar is introduced between a reactor pressure vessel 42 and the shroud 44. By using the pillar supported with the inside surface of the reactor pressure vessel 42 as a supporting portion, the reaction force produced when pressure is applied can be offset. The details of the work will be described later in Description of Embodiment.

The operation of work according to the present invention where welding described above is performed after removing oxide film of the structure will be described below. Since the reactor internals of a light water reactor are installed under water, oxide films are often attached to the reactor internals during service. When the welding work is performed with the oxide film, the electric resistance or the frictional resistance becomes unstable, the oxide film may cause a trouble in the welding work. Therefore, in a case of performing welding work to the reactor internals of a light water reactor, it is preferable to place a cover plate and to perform welding work after removing the oxide film in the region including the contact surface of the structure with the cover plate through discharging work or using a grinder or an emery paper.

Further, when the welding work described above is performed, it is preferable that the electric resistance or the frictional resistance is properly uniform. When the surface roughness of the contact surface is large, the electric resistivity or the frictional resistivity is generally large, and the contact surfaces can be welded with a comparatively small amount of current or comparatively small amount of vibration. However, when the surface roughness is too large, the distribution of the resistivity is non-uniform, which causes a trouble in the welding work. Therefore, in a case of welding a structure made of stainless steel, Ni based alloy or low alloy steel which is objective material of the present invention, it is preferable to place a cover plate and to perform welding work after finishing the surface of the structure to the average surface roughness of 0.2 to 10 μm using the means described above.

DETAILED DESCRIPTION OF THE PREFERRED EMBODIMENTS

The repairing work of reactor internals in a reactor is preferably performed under water since the reactor internals are installed under a γ-ray environment. Detailed embodiments according to the present invention will be described below, referring to experimental examples using structural test pieces having plate-shape under water and examples applied to reactor internals of a nuclear reactor.

(Embodiment 1)

Figure 2:
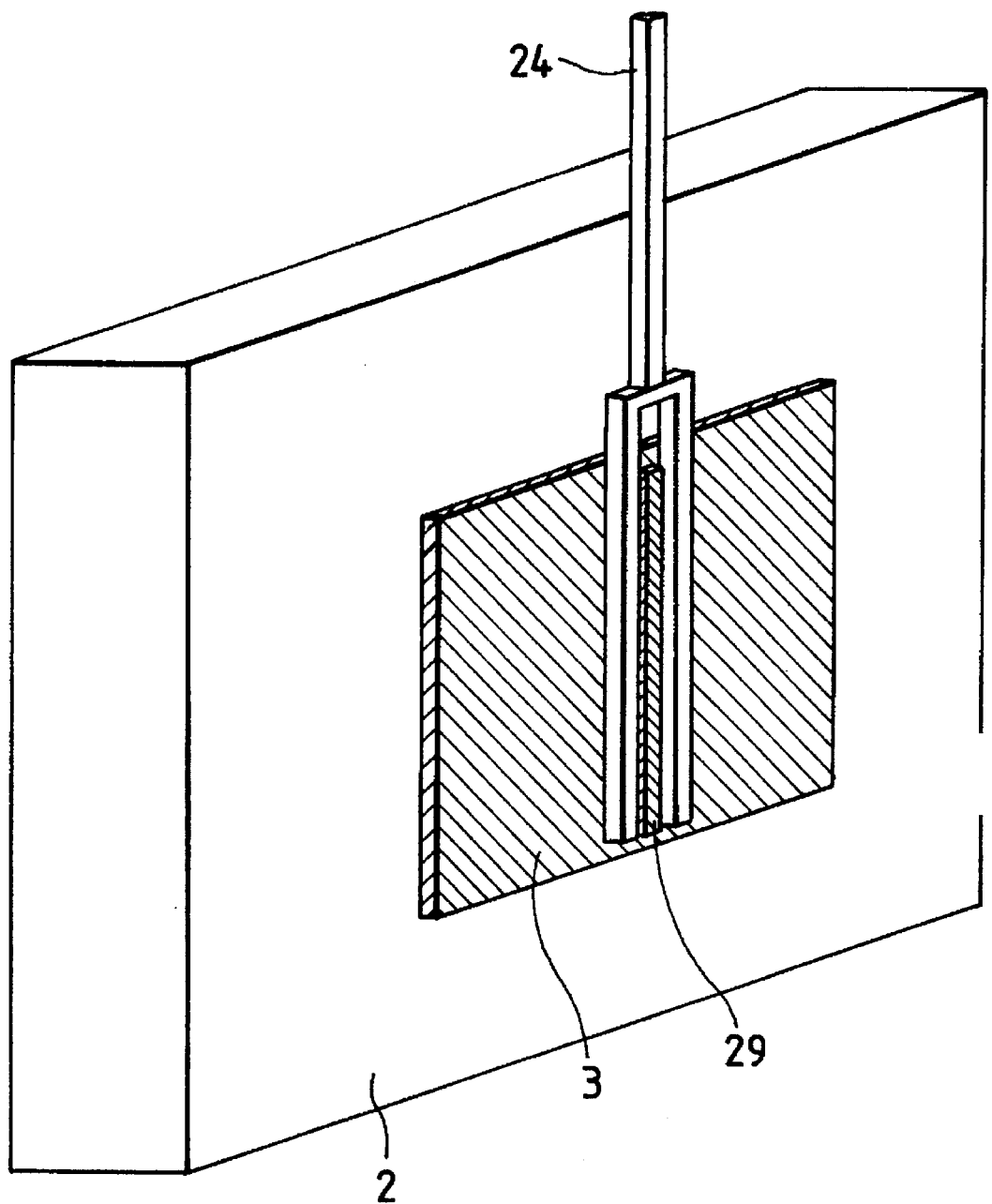
FIG. 2 is a schematic view showing a method of supporting a cover material during work in accordance with the present invention.
Figure 3:
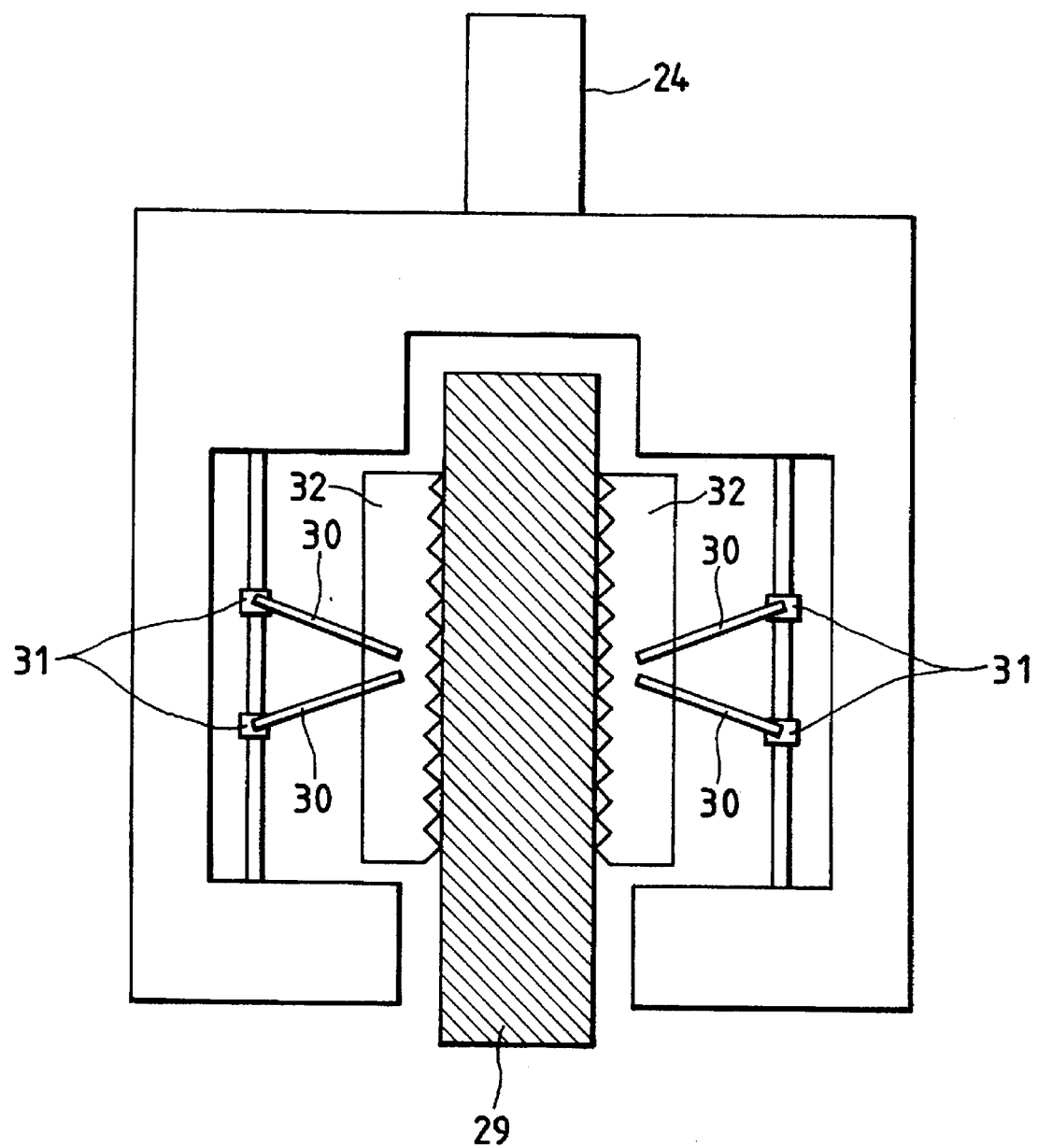
FIG. 3 is a schematic view showing an embodiment of a method of supporting a cover material during work in accordance with the present invention.

As an embodiment according to the present invention, description will be made on an experimental example performed welding work under water from the lateral direction where resistance spot welding is performed by placing a cover plate on a structure and conducting current to the welding surface while pressure is being applied to the welding surface, referring to FIG. 1 to FIG. 3 and Table 1.

A cover plate 3 made of SUS 316L type stainless steel is placed on a structure made of SUS 304 type stainless steel having total neutron irradiation of $1.0 \times 10^{20}$ n/m$^2$ to $5.0 \times 10^{27}$ n/m$^2$ and cracks 1. As to the setting method of the plate 3 in this embodiment, a projecting portion 29 is provided on the back surface of the cover plate 3, and the plate is fixed to a position to be repaired by holding the projecting portion with a fixing jig 24 as shown in FIG. 2. As to the holding method of the projecting portion 29 on the cover plate, for example, holding parts 32 are driven by a arm drive mechanism 31, using arms 30 for driving the holding parts to hold the projecting portion 29 in the cover plate as shown in FIG. 3.

Figure 1:
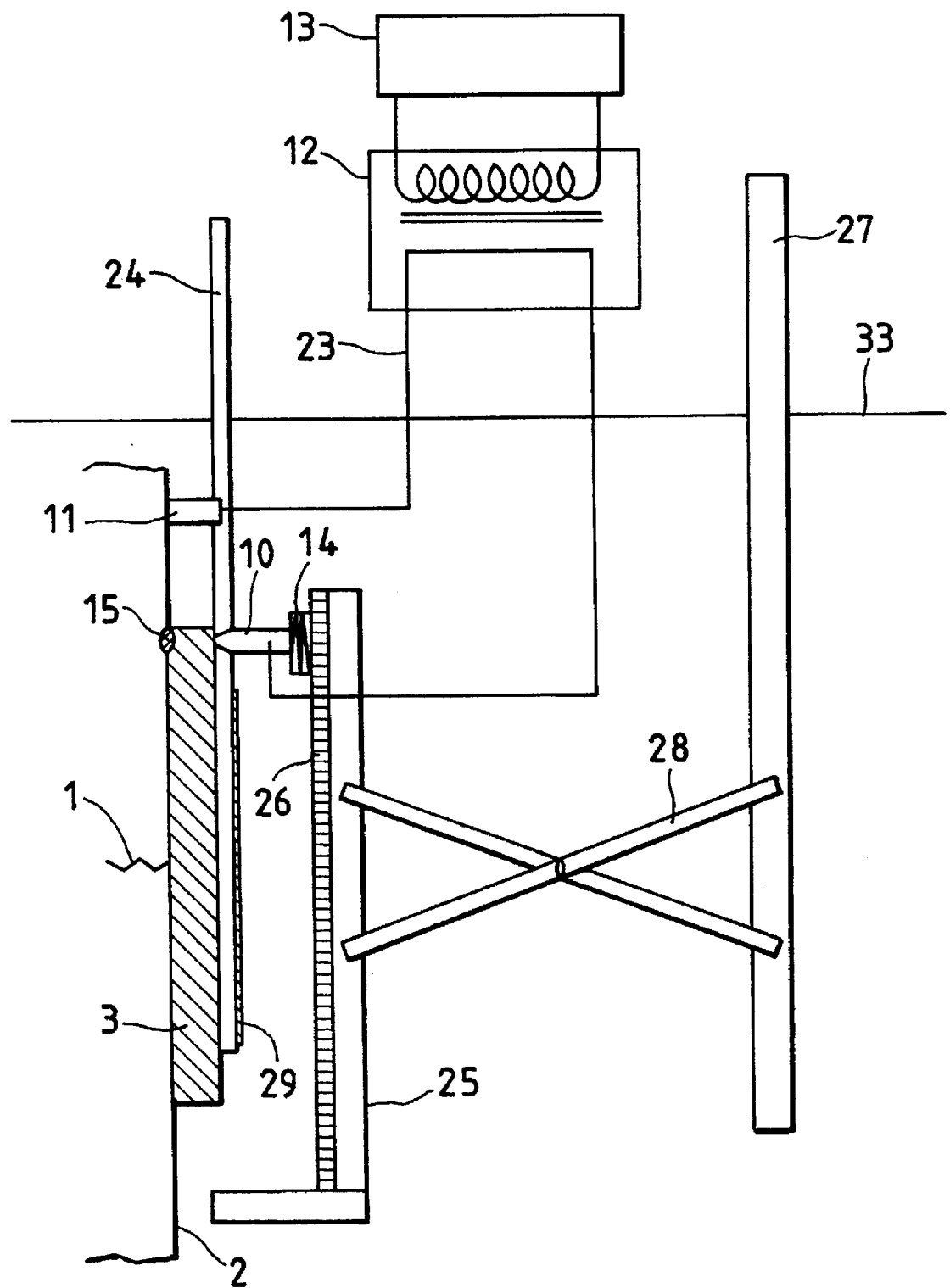
FIG. 1 is a cross-sectional view showing a feature of repairing work under water in accordance with the present invention.

Then, an apparatus having an electrode 10 and a moving stage 25 for the electrode is placed as shown in FIG. 1. A power source 13, a transformer 12 and so on are installed above the water surface, and repairing work is performed by remote operation using a sliding mechanism 26 capable of horizontally and vertically driving arms 28 or the electrode 10. In this embodiment, a supporting pillar 27 is fixed to a portion above the water surface and serves as a pressure supporting portion. A transmitting unit including wiring 23 is enveloped with insulator such as rubber to prevent electric leakage.

Next, the electrode 10 is placed on the portion to be repaired using the arms 28 or the sliding mechanism 26. The electrode 10 to be contacted to the cover plate (hereinafter, referred to as electrode A) is set on the cover plate and an electrode 11 to be contacted to the structure (hereinafter, referred to as electrode B) is contacted to the surface of the structure. The both electrodes are electrically connected each other, and the current flowing between the electrodes and the materials is controlled with the transformer 12. A pressure applying mechanism 14 is provided in the electrode A 10 contacting to the cover plate to locally apply pressure on the contact surfaces of the cover plate 3 and the structure 2. Increasing of the pressure can be attained by providing the projections 21 on the cover plate 3 as shown in FIG. 18a and FIG. 18b, or by providing the cut portions 21 on the structure 2 and placing the cover plate 3 so as to engage the projections 21 on the cover plate 3 with the cut portions. Pressure is applied to the contact portions of the cover plate 3 and the structure 2 just under the electrode A 10 using the pressure applying mechanism 14, and current is conducted under the pressed condition to generate ohmic heat due to the electric resistance of the contact portion to form welded portion 15 with locally melting the cover plate and the structure. The processes of the above work are monitored by a monitoring mechanism provided in the apparatus.

In this embodiment, the work is performed using a plate having thickness of 10 to 40 mm as the structure 2 and a plate having thickness of 10 to 20 mm as the cover plate 3 and under conditions of welding work shown in Table 1. The result is that the structure 2 and the cover plate 3 are welded without occurrence of any new crack in the structure 2.

TABLE 1

| MATERIAL OF ELECTRODE | Cr—Cu |
| --- | --- |
| DIAMETER OF ELECTRODE | 5–20 mm |
| THICKNESS OF COVER PLATE (EXCLUDING PROJECTIONS) | 10–20 mm |
| CURRENT | 10–50 kA |
| CURRENT PASSAGE TIME | 0.02–0.1 s |
| APPLIED PRESSURE | 5–10 kgf/mm$^2$ |

The electrode A 10 is moved step-by-step after completion of welding work for one position. By doing so, the cover plate is welded to the structure continuously. In a case where a plate fixing jig 24 is used as in this embodiment, the vertical periphery of the cover plate 3 shown in FIG. 2 is firstly welded, and when the cover plate 3 is not necessary to be held, the plate fixing jig 24 is removed and then the horizontal periphery of the cover plate is welded.

With the work described above, the cover plate 3 is continuously welded to the structure 2 as shown in FIG. 15, and the portion of the structure 2 having a crack 1 is isolated from the water environment and growth of the crack due to stress corrosion cracking is prevented.

Figure 4:
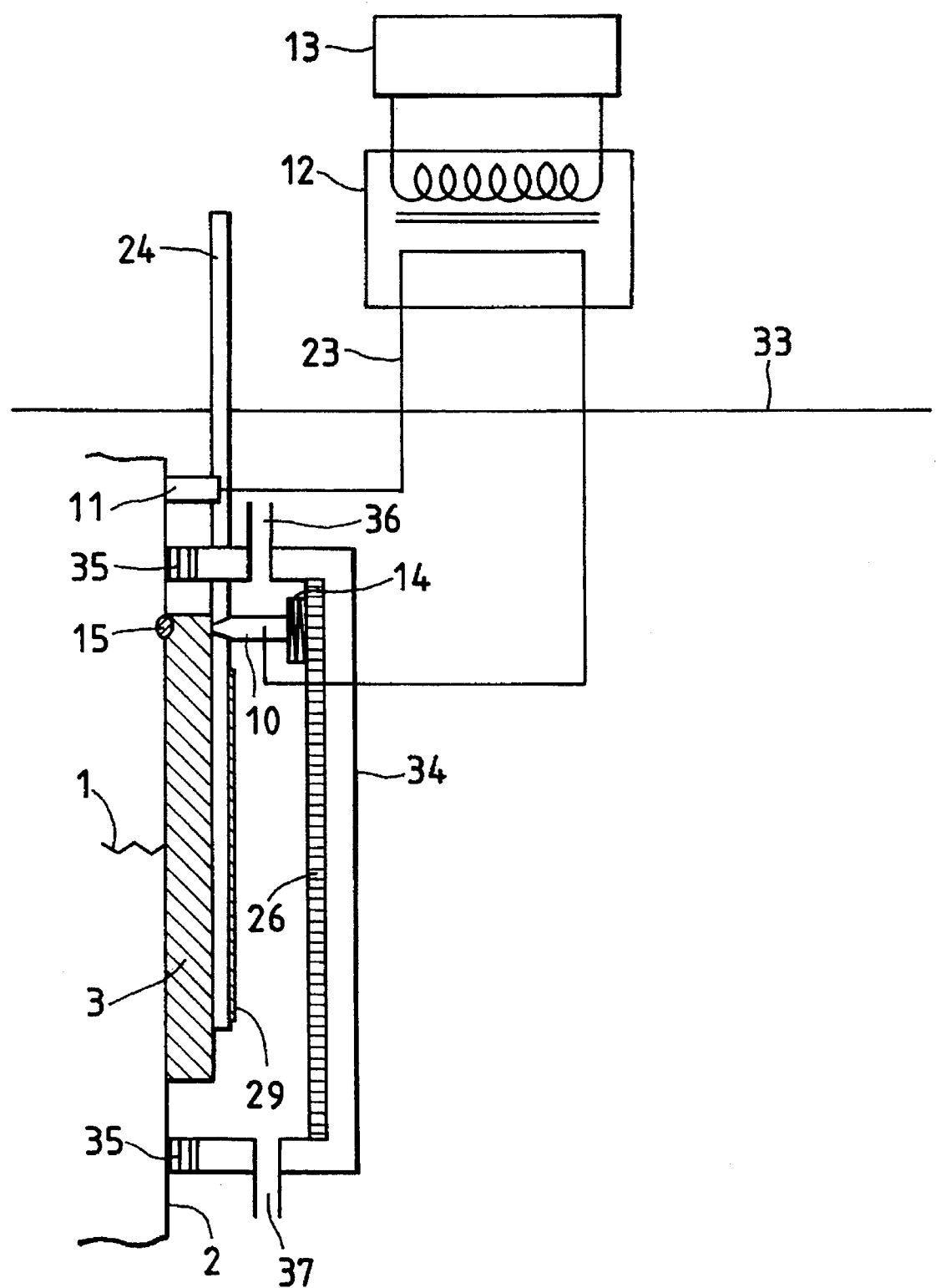
FIG. 4 is a cross-sectional view showing a feature of repairing work in the lateral direction under water using a water removing chamber in accordance with the present invention.

Since the above work in this embodiment is performed under conditions of the electric conductivity of the water smaller than 1.5 μS/cm, current leakage did not take place because of the insulation effect of the water. However, when the electrical conductivity of the water is large and current leakage is apt to take place, it is effective to perform the work inside a chamber shown in FIG. 4. The work is performed by making the inside of the electrode accessing chamber 34 into an air atmosphere, removing the moisture in the portion to be repaired to dry. The chamber 34 is provided with an electric shielding part 35, a gas injection mechanism 36 and an exhaust water/gas mechanism 37.

(Embodiment 2)

As an embodiment according to the present invention, description will be made on an experimental example performed welding work under water from the lateral direction where welding work is performed in spot-state by placing a cover plate on a structure and conducting current to the welding surface through a plurality of electrodes while pressure is being applied to the electrodes, referring to FIG. 5 to FIG. 6 and Table 2.

A cover plate made of SUS 316L type stainless steel is placed on a structure made of SUS 304 type stainless steel having total neutron irradiation of $1.0 \times 10^{20}$ n/m$^2$ to $5.0 \times 10^{27}$ n/m$^2$ and cracks. Then, an apparatus having electrodes and an electrode moving mechanism is placed.

Next, the electrodes are placed on the portion to be repaired using the electrode moving mechanism. In this embodiment, the work except the mechanism to apply pressure on the plurality of electrodes is the same as Embodiment 1, and the portions of the contact surface just under the plurality of electrodes can be welded at a time by providing a mechanism 14 to apply pressure to the plurality of electrodes.

Figure 5:
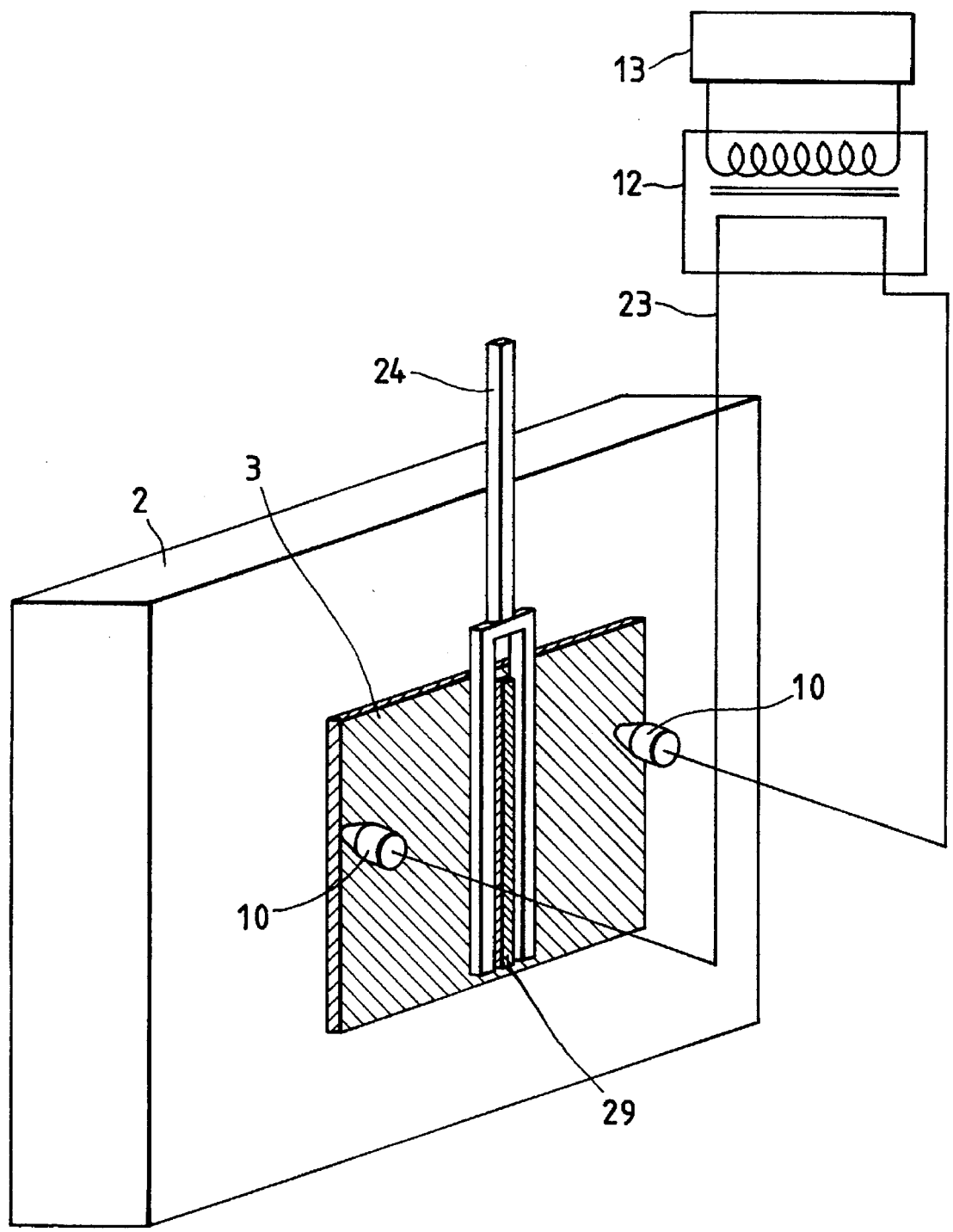
FIG. 5 is a schematic view showing a method with placing two pressed electrodes in accordance with the present invention.
Figure 6:
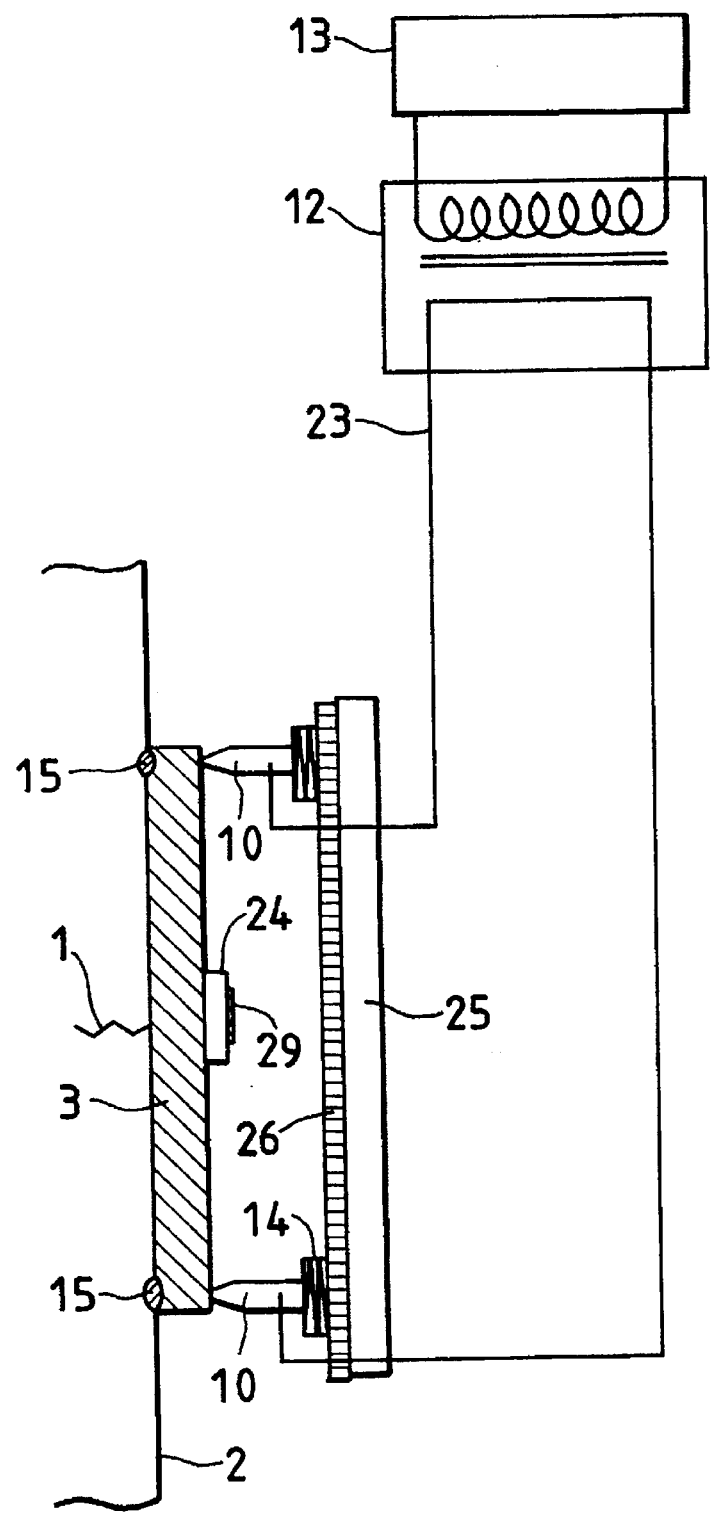
FIG. 6 is a cross-sectional view showing a method with placing two pressed electrodes in accordance with the present invention.

FIG. 5 is a perspective view showing only a portion placing two of the electrodes 10 by omitting the mechanism for moving the electrodes. FIG. 6 is a schematic cross-sectional view showing a working state setting the apparatuses such as a moving stage 25 seeing from the upper side. In a case where welding work of the vertical periphery is performed in this embodiment while a cover plate 3 is held with the plate fixing jig 24 as similar to in Embodiment 1, welding of the both vertical portions of the periphery can be performed at a time by applying pressure to the two electrodes 10 and performing the welding work at a time.

In this embodiment, the work is performed using a plate having thickness of 10 to 40 mm as the structure and a plate having thickness of 10 to 20 mm as the cover plate and under conditions of welding work shown in Table 2. The result is that the structure 2 and the cover plate 3 are welded without occurrence of any new crack in the structure.

TABLE 2

| MATERIAL OF ELECTRODE | Cr—Cu |
| --- | --- |
| DIAMETER OF ELECTRODE | 5–15 mm |
| THICKNESS OF COVER PLATE (EXCLUDING PROJECTIONS) | 10–20 mm |
| CURRENT | 10–50 kA |
| CURRENT PASSAGE TIME | 0.02–0.1 s |
| APPLIED PRESSURE | 5–10 kgf/mm$^2$ |

The electrodes are moved step-by-step after completion of welding work for respective positions. By doing so, the cover plate is welded to the structure continuously as shown in FIG. 15. The portion of the structure 2 having a crack defect 1 is isolated from the water environment and growth of the crack due to stress corrosion cracking is prevented.

(Embodiment 3)

As an embodiment according to the present invention, description will be made on an experimental example performed welding work under water from the lateral direction where welding work is performed using a disk-shaped roller electrode by placing a cover plate on a structure and conducting current to the welding surface while the electrode is being rotated and pressure is being applied to the electrode, referring to FIG. 7 and Table 3.

Figure 7:
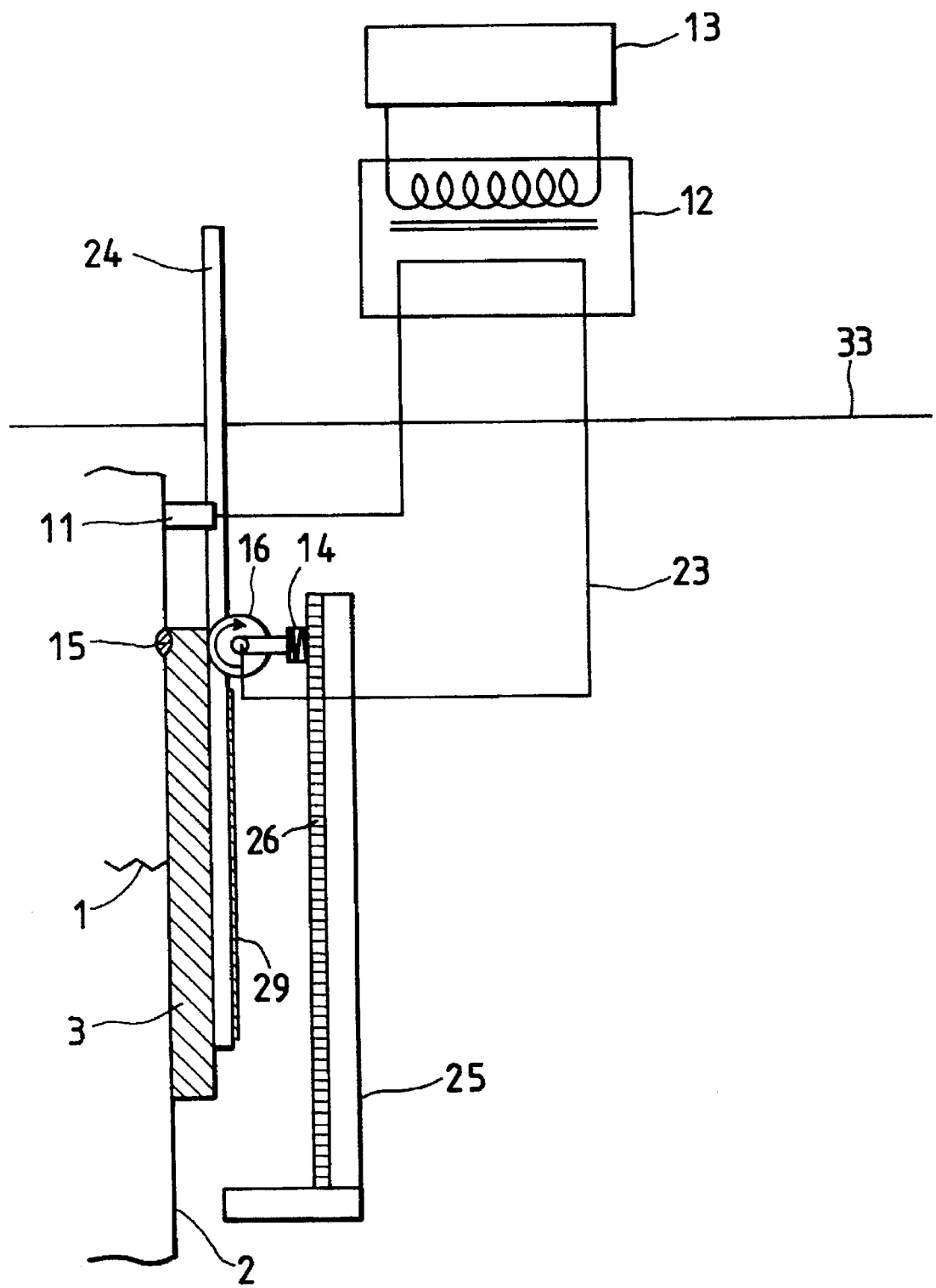
FIG. 7 is a cross-sectional view showing a method using a disk-shaped roller electrode in accordance with the present invention.

FIG. 7 is a schematic cross-sectional view showing welding work using a roller electrode seeing from the lateral direction by omitting the pillar and the arms shown in FIG. 1. Although FIG. 7 shows an apparatus having only one roller electrode having the pressure applying mechanism contacting to a plate, the apparatus may have two roller electrodes having pressure applying mechanisms similarly to the two electrodes in Embodiment 2.

A cover plate 3 made of SUS 316L type stainless steel is placed on a structure 2 made of SUS 304 type stainless steel having total neutron irradiation of $1.0 \times 10^{20}$ n/m$^2$ to $5.0 \times 10^{27}$ n/m$^2$ and cracks. Then, an apparatus having a disk-shaped roller electrode 16 and a moving stage 25 is placed.

Next, the electrode is placed on the portion to be repaired. The roller electrode 16 to be contacted to the cover plate is set on the cover plate and an electrode 11 to be contacted to the structure is contacted to the surface of the structure. The both electrodes are electrically connected each other, and the current flowing between the electrodes and the materials is controlled with a transformer. A continuous welded portion is formed by conducting current to the disk-shaped roller electrode 16 while the electrode is being rotated and pressure is being applied to the electrode.

In this method, the continuous welded portion is easily formed when current is conducted continuously. However, when current is conducted intermittently, the continuous welded portion can be also formed by controlling the current passage time and the speed of welding work. In this embodiment, the intermittently conducting current method is employed.

In this embodiment, the work is performed using a plate having thickness of 10 to 40 mm as the structure 2 and a plate having thickness of 10 to 20 mm as the cover plate 3 and under a condition of welding work shown in Table 3. The result is that the structure 2 and the cover plate 3 are welded without occurrence of any new crack in the structure 2.

TABLE 3

| MATERIAL OF ELECTRODE | Cr—Cu |
| --- | --- |
| DIAMETER OF ELECTRODE | 5–10 mm |
| THICKNESS OF COVER PLATE (EXCLUDING PROJECTIONS) | 10–20 mm |
| CURRENT | 10–50 kA |
| CURRENT PASSAGE TIME | 0.02–0.1 s |
| APPLIED PRESSURE | 5–10 kgf/mm$^2$ |

As the same as in Embodiment 1 and Embodiment 2 a plate fixing jig 24 is used as in this embodiment. The vertical periphery of the cover plate 3 shown in FIG. 2 is firstly welded, and when the cover plate 3 is not necessary to be held, the plate fixing jig 24 is removed and then the horizontal periphery of the cover plate is welded by moving the rotating electrode 16. By doing so, the covered plate is welded to the structure continuously as shown in FIG. 15. The portion of the structure having crack defect is isolated from the water environment and growth of the crack due to stress corrosion cracking is prevented.

(Embodiment 4)

Figure 8:
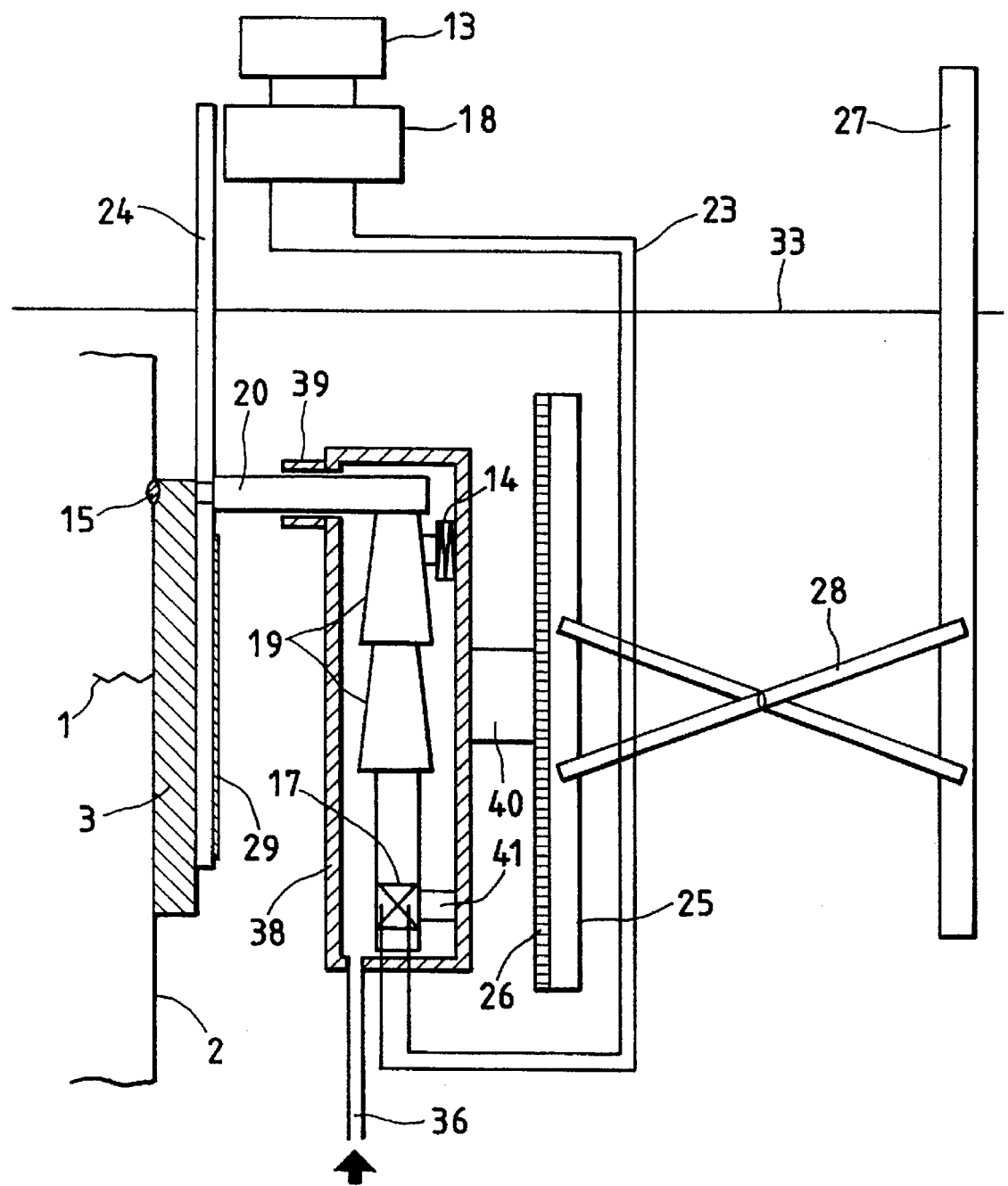
FIG. 8 is a cross-sectional view showing a method giving mechanical vibration using a ultrasonic oscillator in accordance with the present invention.

As an embodiment according to the present invention, description will be made on an experimental example performed welding work under water from the lateral direction where welding work is performed using an ultrasonic oscillator by placing a cover plate on a structure and generating frictional resistance in the welding surface by giving mechanical vibration, referring to FIG. 8 and Table 4.

A cover plate 3 made of SUS 316L type stainless steel is placed on a structure 2 made of SUS 304 type stainless steel having total neutron irradiation of $1.0 \times 10^{20}$ n/m$^2$ to $5.0 \times 10^{27}$ n/m$^2$ and cracks 1. Then, a chamber 38 having a vibrator 17, a resonator 19, a work terminal 20 and a pressure applying mechanism 14 is set, and the inside of the chamber 38 is made to an air atmosphere using a gas injection mechanism 36 by discharging the water through a nozzle 39 to dry the inside of the chamber. The chamber 38 is fixed to the stage 25 through a chamber drive mechanism 40. The vibration element 17 and the resonator 19 are supported on the chamber 38 by a vibrator support 41.

A power source 13, an ultrasonic oscillator 18 and so on are installed above the water surface, and repairing work is performed by remote operation using a supporting pillar 27 and arms 28 in the same way as in Embodiment 1. A transmitting unit including cable 23 is enveloped with insulator such as rubber to prevent electric leakage.

Then, the work terminal 20 is set on the cover plate 3 in the portion to be repaired. By conducting high frequency current having frequency of 20 to 50 Hz to the vibrator, the vibrator 17 is vibrated with magneto-strictive phenomenon. The generated vibration is amplified in its amplitude with a resonator 19, and the work terminal 20 is vibrated with the amplified amplitude. With the vibration, friction causes in the contact surfaces of the covered plate 3 and the structure 2 just under the work terminal 20 pressed with a pressure applying mechanism 14. Plastic deformation as well as heat is generated in the contact surfaces with the friction. The deformed surfaces are closely approached to each other to a distance of acting inter-atomic force by the effect of atomic movement due to the pressure and the heating up to a temperature above re-crystallization, and then the contact surfaces are welded together with bonding force to form a welding portion 15.

Increasing of the pressure can be attained by providing the projections 21 on the cover plate 3 as shown in FIG. 18a and FIG. 18b, or by providing the cut portions 21 on the structure 2 and placing the cover plate 3 so as to engage the projections 21 on the cover plate 3 with the cut portions. The processes of the above work are monitored by a monitoring mechanism provided in the apparatus.

In this embodiment, the work is performed using a plate having thickness of 10 to 40 mm as the structure and a plate having thickness of 10 to 20 mm as the cover plate and under conditions of welding work shown in Table 4. The result is that the structure and the cover plate are welded without occurrence of any new crack in the structure.

TABLE 4

| | |
| --- | --- |
| THICKNESS OF COVER PLATE (EXCLUDING PROJECTIONS) | 10–20 mm |
| DIAMETER OF WORK TERMINAL | 2–10 mm |
| FREQUENCY | 20–50 Hz |
| CAPACITY | 2–10 kW |
| WELDING TIME PER SPOT | 0.5–5 s |
| APPLIED PRESSURE | 1–20 kgf/mm$^2$ |

Figure 19A:
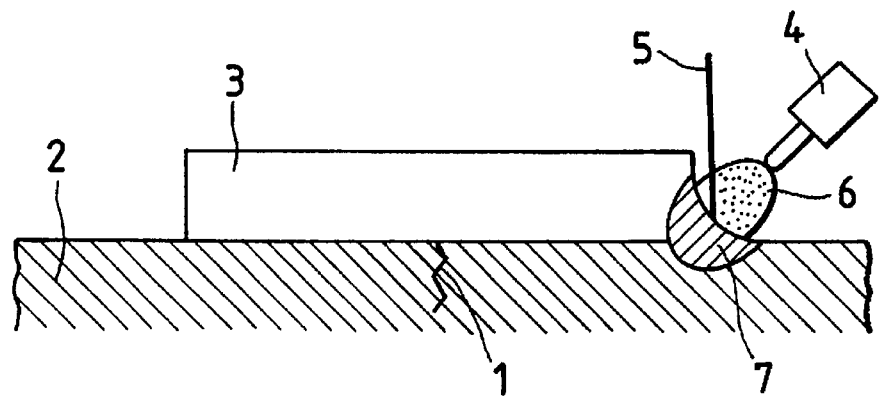
FIG. 19a is a conceptual view showing the feature of filler welding work performed by covering a plate on a structure irradiated with neutrons and having a crack and using arc in accordance with a conventional technology.
Figure 19B:
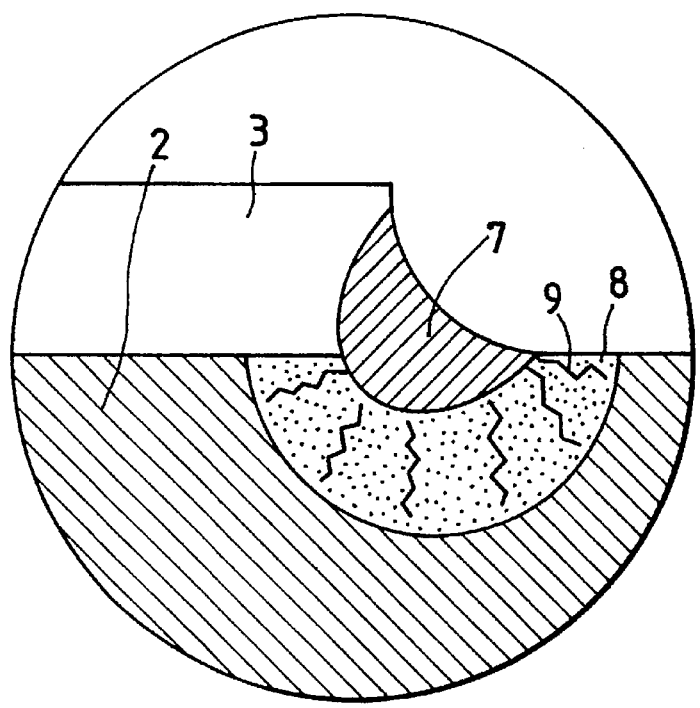
FIG. 19b is a conceptual view showing the feature of filler welding work which is performed by covering a plate on a structure irradiated with neutrons and having a crack and using arc in accordance with a conventional technology.

The work terminal is moved step-by-step after completion of welding work for respective positions. By doing so, the cover plate is welded to the structure continuously as shown in FIG. 19. The portion of the structure having a crack is isolated from the water environment and growth of the crack due to stress corrosion cracking is prevented.

(Embodiment 5)

As an embodiment of applying the present invention to the reactor internals inside a nuclear reactor, an example of applying the work described in Embodiment 1 to Embodiment 4 to the inner surface or outer surface of a shroud of the reactor structure will be described below, referring to FIG. 9 to FIG. 12.

FIG. 9 is a cross-sectional view showing the inside of a reactor pressure vessel 42 under maintenance work where an upper head of the reactor pressure vessel 42 is removed after stopping operation, a steam dryer assembly, steam-water separators, and fuel assemblies are sequentially removed, control rods are lowered to the bottom portion of the reactor vessel or withdrawn, neutron monitor tubes are also removed from the reactor pressure vessel, if necessary, and the core portion is filled with water. Before starting repairing work, the neutron irradiated dose of the shroud, the position of crack-shaped defects and the size of the region covering the defect portion are measured. Then, the oxide film on the surface of the portion to be repaired is mechanically removed and at the same time the portion to be repaired on the inner surface of the shroud 44 is finished to an average surface roughness of 0.2 to 10 μm. This mechanical surface treatment is to mechanically remove oxide film on the surface and mirror-finished state of the surface using a rotating emery paper driven by a motor.

After the mechanical surface treatment described above, a cover plate is placed in the region to be repaired to cover the defects using a plate fixing jig.

Figure 10:
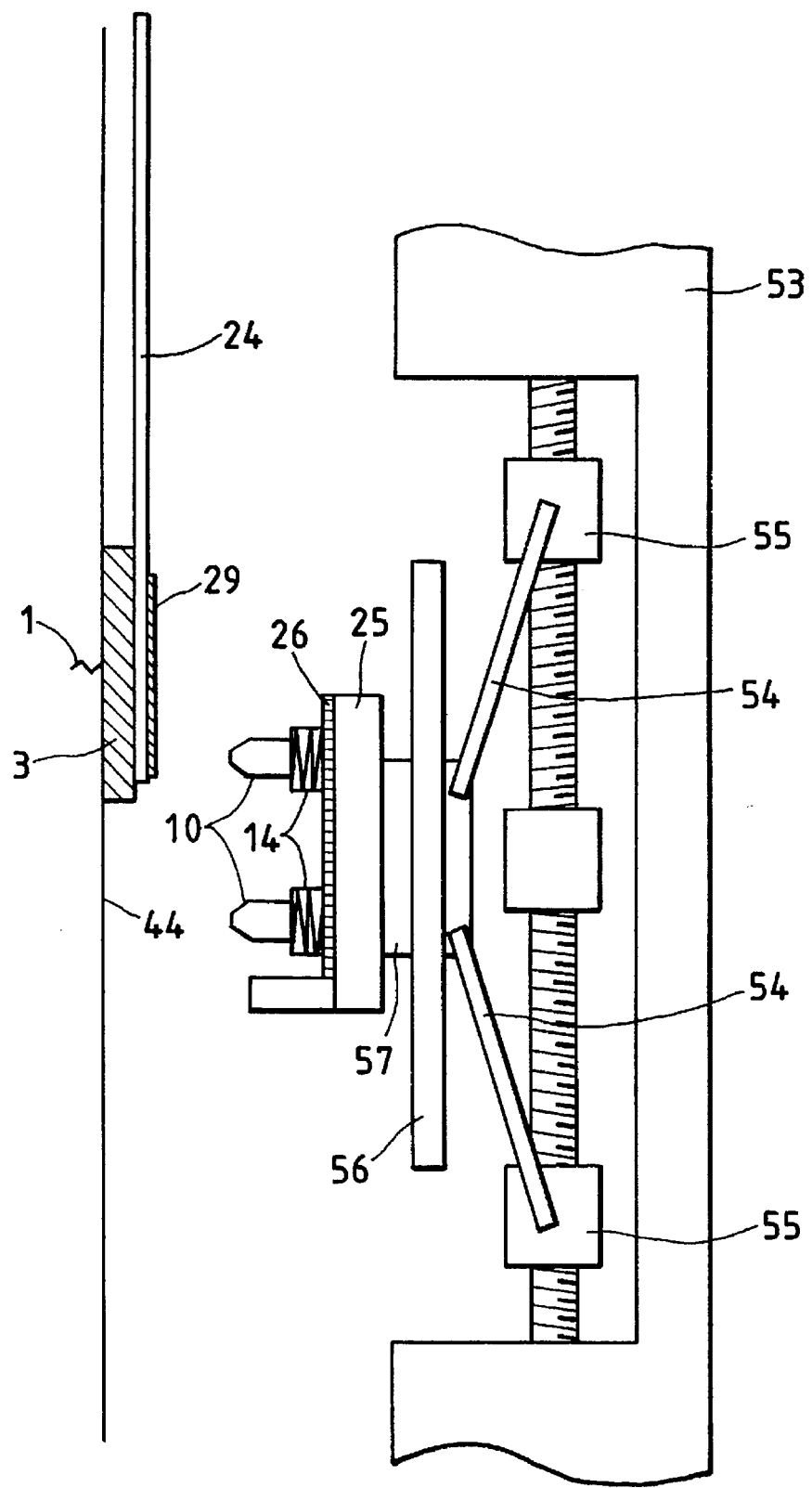
FIG. 10 is a schematic view showing an embodiment of a repairing method inside a reactor pressure vessel in accordance with the present invention.

Then, a work apparatus having a structure shown in FIG. 9 and FIG. 10 is accessed to the portion. The work apparatus is mounted on the top ends of secondary arms 54 having an extending mechanism in a supporting pillar 53 for in-core working. The secondary arms 54 have secondary arm driving mechanism 55 to move the work apparatus to the direction perpendicular to the supporting pillar. In the top end of the arms provided are a sliding mechanism 56 for moving stage on which the work apparatus is slidable and a rotating mechanism 57 for rotating the sliding mechanism to the direction in which the work apparatus is moved along the line of welding work of the portion to be repaired. Using the supporting pillar 53 for in-core work and the secondary arms 54, the work apparatus is accessed to the portion to be repaired where the cover plate 3 and the shroud 44 are welded.

Figure 12:
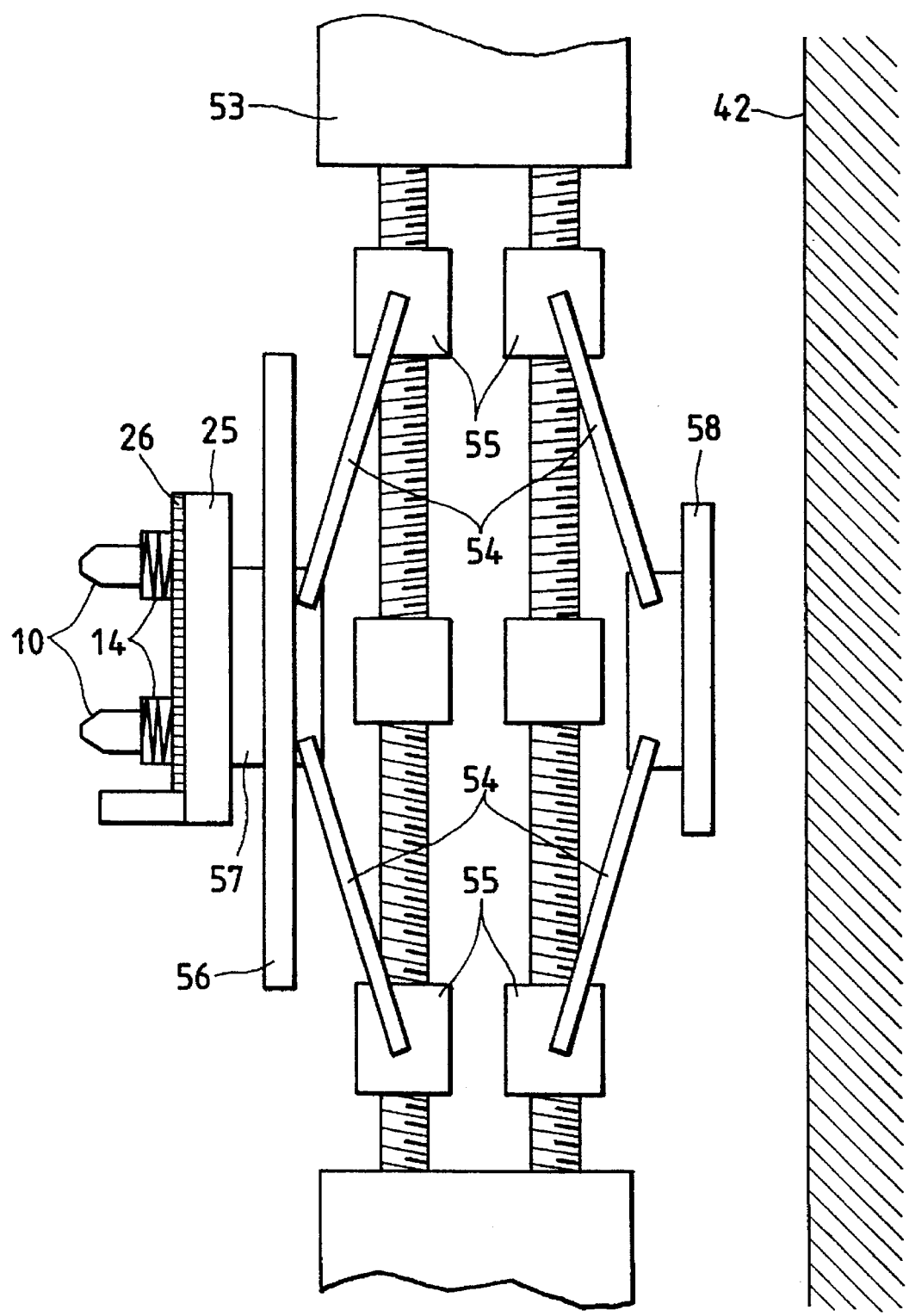
FIG. 12 is a cross-sectional view showing a supporting pillar and a work apparatus for accessing to the outer surface of a shroud in accordance with the present invention.

Next, the welding work of the cover plate 3 and the inner surface of the shroud 44 is performed as described in Embodiment 1 to Embodiment 4. Therein, various kinds of driving and control are operated from a remote operation room 48. Inside the remote operation room 48 on an operating floor 47, a power source and a transformer are installed in a case of performing welding work by utilizing current as described in Embodiment 1 to Embodiment 3, and a power source and an ultrasonic oscillator are installed in a case of performing welding work utilizing mechanical vibration as described in Embodiment 4. Each of FIG. 10 and FIG. 12 shows an apparatus having the two electrodes having the respective pressure applying mechanisms described in Embodiment 2. However, it is possible to employ the apparatus having the roller electrode 16 shown in FIG. 11 or the apparatus described in Embodiment 1 to Embodiment 4. Further, in each case of the repairing work, various kinds of controlling systems, such as control systems for supporting pillar inserting, secondary arm driving, positional adjusting and driving electrode or work terminal, applied pressure, monitoring of working state, lighting and so on, are installed in the remote operation room 48.

In a case of work using a chamber for removing water, the chamber is attached to the top ends of the secondary arms described above, and various control systems installed in the remote operation room 48 remotely control injection of shielding gas into the chamber, monitoring of working state, lighting, removing water, injecting of gas, exhausting of gas or dust, monitoring of gas flow rate, monitoring of gas pressure, monitoring of temperature, monitoring of humidity and so on.

Therein, welding work is performed while pressure is applied to the welding surface just under the electrode or the work terminal using the pressure applying mechanism 14. However, in the in-core work such as the embodiment, the reaction force produced when applying the pressure is required to be offset since the welding apparatus including the plate fixing jig 24 and the moving stage 25 is moved horizontally using a hoist 49 to access to the portion to be repaired. The supporting means for offsetting the reaction force caused by the pressure applied during in-core work will be described below, referring to FIG. 9 to FIG. 12.

In a case of performing the repairing work described above by placing a cover plate 3 to the inner surface of the shroud 44, firstly the top portion of a plate fixing jig 24 is fixed to the upper grid plate 34 as shown in FIG. 9. Then, a supporting pillar 53 for in-core work is inserted through the upper grid plate 43 into the core support plate 45 to fix the supporting pillar with the upper grid plate 43 and the core support plate 45. The supporting pillar 53 for in-core work fixed with the upper grid plate 43 and the core support plate 45 is used for a pressure supporting portion to offset the reaction force with the fixed portions as supporting points. In the work described above, it is possible to apply pressure to the portion to be repaired using the pressure applying mechanism as shown in FIG. 10.

In a case of performing the repairing work described above by placing a cover plate 3 to the outer surface of the shroud 44, firstly the top portion of the plate fixing jig 24 is fixed to a component or a hook attached to or near the shroud. Then, the supporting pillar 53 for in-core work having a pressure supporting plate 58 is inserted in putting the pressure supporting plate 58 as to face to and touch to the inner surface of the reactor pressure vessel 42 as shown in FIG. 12. The supporting pillar 53 for in-core work touching to the inner surface of the reactor pressure vessel 42 becomes a pressure supporting position for offset the reaction force with the pressure supporting plate 58 attaching to the reactor pressure vessel as a supporting point. Thereby, it is possible to apply pressure to the portion to be repaired using the pressure applying mechanism during the above work.

The series of processes of work described above are monitored with a monitoring mechanism for working state. In the last stage, it is confirmed that cracks are not occurred in the repaired portion and the vicinity of the repaired portion using the monitoring mechanism, and then the repairing work is completed.

According to the present invention, for a structure in a reactor pressure vessel irradiated with neutrons and having crack defects, it is possible to prevent growth of the cracks and occurrence of cracks during repairing. There is an effect in that an accident due to stress corrosion cracking in the nuclear power plant can be prevented and the integrity of the plant can be made durable.

The invention is suitable in use for reactor internals structures in a light water nuclear reactor plant which is already used. The method of the invention is practiced under conditions of high water pressure environment in water. Therefore, it is necessary to consider, in case of pressure application to the welding portion, water depth of the position at which the method according to the present invention is practiced under such conditions. For example, the pressure or load is adjusted so that the pressure applied to the welding portion increases 1 atm each ten meter increased.

Further, an object to be treated by the invention is nuclear reactor internals structure irradiated with neutrons. In case martensite phase due to working or plastic deformation occurs on the above-mentioned structure surface, hydrogen induced cracking sensibility or stress corrosion cracking sensibility may be increased. Therefore, in the present invention, it is desirable to adjust the pressure or load to be applied on the welding portion in order to avoid formation of the above-mentioned martensite phase or occurrence of too large plastic deformation.

What is claimed is:

1. A method of repairing a neutron-irradiated structural material having a defect in a nuclear reactor internals, which comprises the steps of:

covering said structural material to be repaired with a plate to cover over a portion thereof having the defect;

welding said plate and said structural material by locally applying pressure on the surface of said plate and adding energy to the portion to which the pressure is applied thereby to generate thermal energy in the contact surfaces between said plate and said structural material.

2. A method of repairing a neutron-irradiated structural material with a defect in a nuclear reactor internals according to claim 1, wherein in said welding step, said energy is electrical energy, which is added to said portion to which the pressure is applied thereby to generate thermal energy in the contact surface between said plate and said repaired structural material.

3. A method of repairing a neutron-irradiated structural material having a defect in a nuclear reactor internals, which comprises the steps of:

covering said structural material to be repaired with a plate to cover over a portion thereof having the defect;

seam welding said plate and said structural material by locally applying pressure on the surface of said plate and adding electrical energy to the portion to which the pressure is applied using a roller electrode thereby to generate thermal energy in the contact surface between said plate and said structural material.

4. A method of repairing a neutron-irradiated structural material with a defect in a nuclear reactor internals according to claim 2, wherein in said welding step, said plate and the structural material is welded by resistance spot welding.

5. A method of repairing a neutron-irradiated structural material with a defect in a nuclear reactor internals according to claims 2, wherein said structural member and said plate are welded at a plurality of positions at a time by allowing current to flow in a plurality of electrodes having pressure applying means while applying pressure on the electrodes.

6. A method of repairing a neutron-irradiated structural material with a defect in a nuclear reactor internals according to claim 1, wherein in said welding step, mechanical energy is added as said energy to the portion to which the pressure is applied thereby to generate thermal energy caused by frictional resistance in the contact surface between said plate and said structural material.

7. A method of repairing a neutron-irradiated structural material having a defect in a nuclear reactor internals, which comprises the steps of:

covering said structural material to be repaired with a plate to cover over a portion thereof having the defect;

welding said plate and said structural material by giving mechanical vibration while locally applying pressure on the surface of said plate and adding mechanical energy to the portion to which the pressure is applied thereby to generate thermal energy caused by mechanically rubbing the contact surfaces of said plate and said structural material.

8. A method of repairing a neutron-irradiated structural material with a defect in a nuclear reactor internals according to claim 7, wherein said mechanical vibration is obtained by converting high frequency energy into mechanical vibration through magnetostriction.

9. A method of repairing a neutron-irradiated structural material with a defect in a nuclear reactor internals according to claim 1, wherein convex projections are provided on the surface of said cover plate to be welded to said structural material.

10. A method of repairing a neutron-irradiated structural material with a defect in a nuclear reactor internals according to claim 9, wherein concave notches are provided on the positions of said structural material contacting said convex projections on said cover plate, said cover plate being placed and welded to said structural material by engaging said convex projections on the welding surface of said cover plate with said concave notches.

11. A method of repairing a neutron-irradiated structural material with a defect in a nuclear reactor internals according to claim 1, wherein a reactor internal structure or component is used as a supporting portion for means for offsetting the reaction force produced when said pressure is applied.

12. A method of repairing a neutron-irradiated structural material with a defect in a nuclear reactor internals according to claim 11, wherein a supporting pillar is introduced between an upper grid plate and a core support plate of a light water reactor internals, said pillar supported with said upper grid plate and said core support plate being used as said supporting portion for means for offsetting the reaction force produced when said pressure is applied.

13. A method of repairing a neutron-irradiated structural material with a defect in a nuclear reactor internals according to claim 11, wherein a supporting pillar is introduced between a pressure vessel and a core shroud, said supporting pillar supported with the inner surface of the pressure vessel being used as said supporting portion for means for offsetting the reaction force produced when said pressure is applied.

14. A method of repairing a neutron-irradiated structural material with a defect in a nuclear reactor internals according to claim 1, wherein work for clearing the oxide film existing on a region including the welding surface of said position of the structural material to be repaired with the cover plate is performed before placing the cover plate on a position of the structural material to be repaired.

15. A method of repairing a neutron-irradiated structural material with a defect in a nuclear reactor internals according to claim 14, the method comprises the steps of:

performing the work for clearing the oxide film existing on a region including the welding surface of said position of the structural material to be repaired with the cover plate;

performing surface finishing of the region including the welding surface of said position of the structural material to an average roughness of 0.2 to 10 μm;

after performing said surface finishing, placing the cover plate and welding the plate to said position of the structural material.

16. A method of repairing a neutron-irradiated structural material with defect in a nuclear reactor internals according to claim 1, wherein the outer periphery of the cover plate is continuously welded to said structural material so as to isolate the defect in said structural material from the outer environment.

* * * * *